US012600642B2

(12) United States Patent
Lu et al.

(10) Patent No.: US 12,600,642 B2
(45) Date of Patent: Apr. 14, 2026

(54) METHODS FOR EXTRACTING LITHIUM FROM BRINES

(71) Applicant: SAUDI ARABIAN OIL COMPANY, Dhahran (SA)

(72) Inventors: Peng Lu, Dhahran (SA); Pan Luo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 448 days.

(21) Appl. No.: 18/295,443

(22) Filed: Apr. 4, 2023

(65) Prior Publication Data

US 2024/0336491 A1      Oct. 10, 2024

(51) Int. Cl.
*C01D 15/08* (2006.01)

(52) U.S. Cl.
CPC ................................... *C01D 15/08* (2013.01)

(58) Field of Classification Search
CPC ..................................................... C01D 15/08
See application file for complete search history.

(56) References Cited

U.S. PATENT DOCUMENTS

| | | | |
|---|---|---|---|
| 4,243,392 A | 1/1981 | Brown et al. | |
| 4,261,960 A | 4/1981 | Boryta | |
| 4,287,163 A | 9/1981 | Garrett et al. | |
| 5,993,759 A | 11/1999 | Wilkomirsky | |
| 6,143,260 A | 11/2000 | Boryta | |
| 7,157,065 B2 | 1/2007 | Boryta et al. | |
| 8,641,992 B2 | 2/2014 | Galli et al. | |
| 8,741,256 B1 | 6/2014 | Harrison | |
| 9,169,125 B2 | 10/2015 | Kang et al. | |
| 9,534,276 B1 | 1/2017 | Harrison et al. | |
| 10,322,950 B2 | 6/2019 | Snydacker et al. | |
| 2021/0180153 A1* | 6/2021 | Hein | B01D 9/004 |
| 2022/0042182 A1 | 2/2022 | Dara et al. | |

FOREIGN PATENT DOCUMENTS

| | | |
|---|---|---|
| CA | 2729886 A1 | 1/2010 |
| CN | 101318670 A | 12/2008 |
| CN | 101538057 A | 9/2009 |

| | | |
|---|---|---|
| CN | 103508472 A | 1/2014 |
| WO | 2017005113 | 1/2017 |
| WO | 2021119841 A1 | 6/2021 |

OTHER PUBLICATIONS

Harvie, C.E., Møller, N. and Weare, J.H. (1984) The prediction of mineral solubilities in natural waters: the Na—K—Mg—Ca—H—Cl—SO4—OH—HCO3—CO3—CO2—H2O system to high ionic strengths at 25° C. Geochim. Cosmochim. Acta, 48, 723-751.
Wang, J., Wu, X., & Zhang, S. (2018). Development of a thermodynamic model for the Li2CO3—NaCl‘Na2SO4—H2O system and its application. The Journal of Chemical Thermodynamics, 123, 62-73.
Liu, G., Zhao, Z., & Ghahreman, A. (2019). Novel approaches for lithium extraction from salt-lake brines: A review. Hydrometallurgy, 187, 81-100.
Sun, Y., Wang, Q., Wang, Y., Yun, R., & Xiang, X. (2021). Recent advances in magnesium/lithium separation and lithium extraction technologies from salt lake brine. Separation and Purification Technology, 256, 117807.
Zhang, Y., Hu, Y., Sun, N., Khoso, S. A., Wang, L., & Sun, W. (2019). A novel precipitant for separating lithium from magnesium in high Mg/Li ratio brine. Hydrometallurgy, 187, 125-133.

* cited by examiner

*Primary Examiner* — Stuart L Hendrickson
(74) *Attorney, Agent, or Firm* — Vorys, Sater, Seymour and Pease LLP

(57)      ABSTRACT

Methods for extracting lithium from brines may include evaporating at least a portion of a brine using a number of one or more solar evaporation ponds to form a first slurry. A first solid may be separated from the first slurry and combined with an amount of a first precipitation additive to form a second slurry. A first liquid may be separated from the second slurry and at least a portion of the first liquid may be evaporated in a solar evaporation pond to form a third slurry. A second liquid may be separated from the third slurry and combined with an amount of a second precipitation additive to form a fourth slurry. A second solid may be separated from the fourth slurry and rehydrated, forming a fifth slurry. About 90 wt % or more of a salt in a solid product separated from the fifth slurry may be lithium carbonate.

20 Claims, 24 Drawing Sheets

METHODS FOR EXTRACTING LITHIUM FROM BRINES

FIELD OF THE DISCLOSURE

The present disclosure relates generally to extracting lithium from brines and, more particularly, to extracting lithium from brines by precipitation.

BACKGROUND OF THE DISCLOSURE

Lithium is a valuable and versatile metal with many uses, including electronics, ceramics, and pharmaceuticals. A primary use of lithium is in lithium-ion batteries, which are rechargeable and commonly used in personal electronic devices such as laptop computers and smartphones, and in large devices including electric vehicles. Because lithium-ion batteries have a high energy density, the batteries can store more energy per unit weight compared to conventional batteries, allowing lithium-ion batteries to last long periods of time between each recharge.

Lithium can be obtained from a variety of sources. One of the most common sources of lithium is from minerals including spodumene, petalite, and lepidolite, which are found in hard-rock deposits. Lithium can also be obtained from the minerals eucryptite and amblygonite, which are found in pegmatite deposits.

Lithium mining has become an important industry, as the demand for lithium has grown rapidly. Australia, Chile, and Argentina together account for the majority of the world's lithium production. Recently, lithium mining has expanded to countries such as China, the United States, and Canada as lithium demand continues to grow. However, lithium mining has several environmental and social impacts that must be considered. For example, lithium mining can be water-intensive, putting pressure on water resources in arid regions where lithium mines are commonly found. Lithium mining may also contribute to the destruction of habitats and the displacement of wildlife. Additionally, the extraction and processing of lithium obtained from lithium mines can produce waste and by-products that may be harmful to humans. Because of these considerations, it is imperative that safe and cost-effective lithium extraction methods are established to meet the ever-increasing demand for this valuable metal.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, methods may comprise evaporating at least a portion of a brine using a number of one or more solar evaporation ponds to form a first slurry, wherein a concentration of magnesium in the brine is about 100 ppm to about 50,000 ppm and a concentration of lithium in the brine is about 0.01 ppm to about 5,000 ppm and wherein the number of one or more solar evaporation ponds is a first output of a geochemical prediction model. A first solid may be separated from the first slurry and combined with an amount of a first precipitation additive comprising soda ash, slaked lime, or a combination thereof to form a second slurry comprising magnesium hydroxide, magnesium carbonate, or a combination thereof, wherein the amount of the first precipitation additive is a second output of the geochemical prediction model. A first liquid may be separated from the second slurry and at least a portion of the first liquid may be evaporated in a solar evaporation pond to form a third slurry. A second liquid may be separated from the third slurry and combined with an amount of a second precipitation additive comprising soda ash to form a fourth slurry comprising lithium carbonate, wherein the amount of the second precipitation additive is a third output of the geochemical prediction model. A second solid may be separated from the fourth slurry and rehydrated to form a fifth slurry. A solid product may be separated from the fifth slurry, wherein about 90 wt % or more of a salt in the solid product is lithium carbonate.

In another embodiment, methods may comprise evaporating at least a portion of a brine using a number of one or more solar evaporation ponds to form a first slurry, wherein a concentration of magnesium in the brine is about 100 ppm to about 50,000 ppm and a concentration of lithium in the brine is about 0.01 ppm to about 5,000 ppm and wherein the number of one or more solar evaporation ponds is a first output of a geochemical prediction model. A first liquid may be separated from the first slurry and combined with an amount of a first precipitation additive comprising soda ash, slaked lime, or a combination thereof to form a second slurry comprising magnesium hydroxide, magnesium carbonate, or a combination thereof, wherein the amount of the first precipitation additive is a second output of the geochemical prediction model. A second liquid may be separated from the second slurry and at least a portion of the second liquid may be evaporated in a solar evaporation pond to form a third slurry. A third liquid may be separated from the third slurry and combined with an amount of a second precipitation additive comprising soda ash to form a fourth slurry comprising lithium carbonate, wherein the amount of the second precipitation additive is a third output of the geochemical prediction model. A first solid may be separated from the fourth slurry and rehydrated to form a fifth slurry. A solid product may be separated from the fifth slurry, wherein about 90 wt % or of a salt in the solid product is lithium carbonate.

In a further embodiment, methods may comprise evaporating at least a portion of a brine using a number of one or more solar evaporation ponds to form a first slurry, wherein a concentration of magnesium in the brine is about 100 ppm to about 50,000 ppm and a concentration of lithium in the brine is about 0.01 ppm to about 5,000 ppm and wherein the number of one or more solar evaporation ponds is a first output of a geochemical prediction model. A first liquid may be separated from the first slurry and combined with an amount of a first precipitation additive comprising soda ash, slaked lime, or a combination thereof to form a second slurry comprising magnesium hydroxide, magnesium carbonate, or a combination thereof, wherein the amount of the first precipitation additive is a second output of the geochemical prediction model. A second liquid may be separated from the second slurry and combined with an amount of a second precipitation additive comprising soda ash to form a third slurry comprising lithium carbonate, wherein the amount of the second precipitation additive is a third output of the geochemical prediction model. A first solid may be separated from the third slurry and rehydrated to form a fourth slurry. A solid product may be separated from the fourth slurry, wherein about 90 wt % or more of a salt in the solid product is lithium carbonate.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
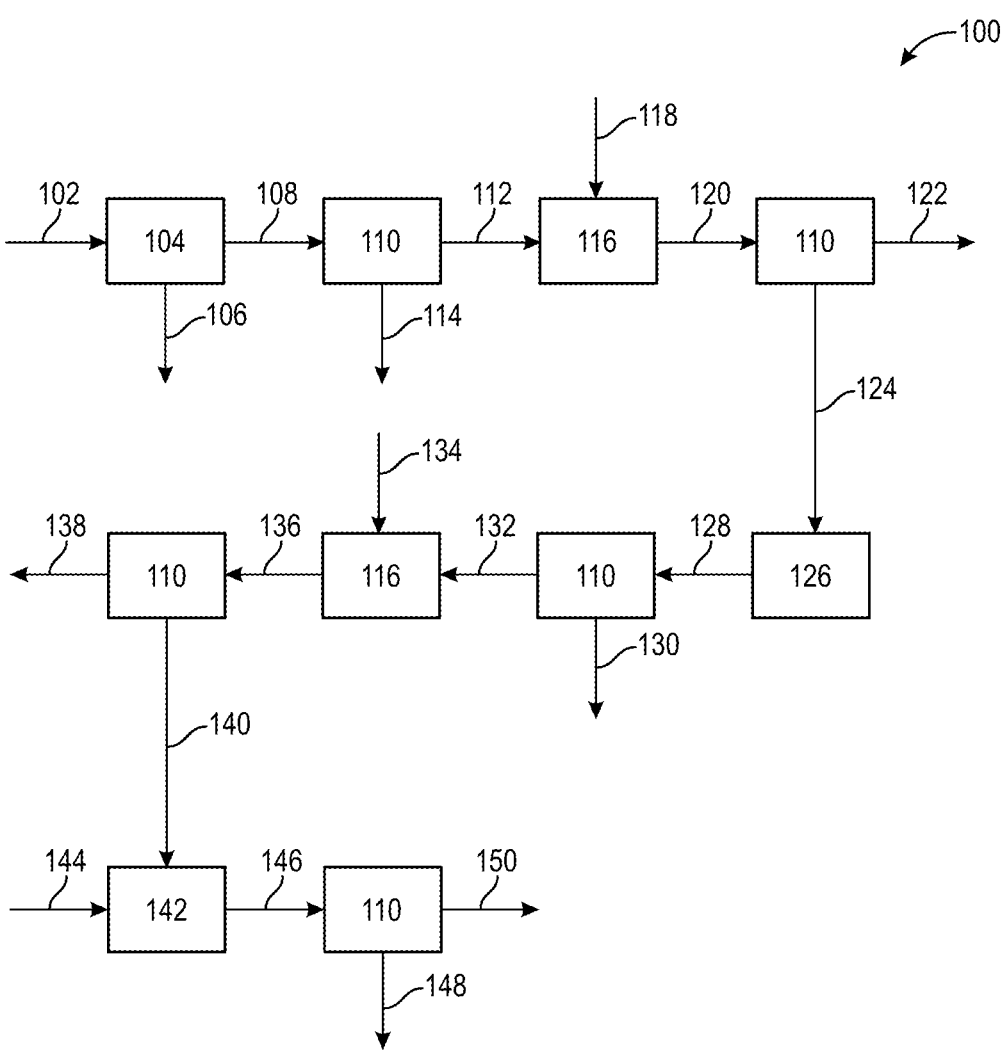
FIG. 1 is a schematic of a lithium extraction method according to one or more embodiments of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to extracting lithium from brines and, more particularly, to extracting lithium from brines by precipitation. The extraction of lithium from brines containing dissolved lithium has been suggested to be a more cost-effective and environmentally-safe alternative to conventional lithium mining. The presence of lithium in brines is due to the natural processes of weathering, erosion, and leaching, which release lithium into the groundwater, resulting in the formation of brine deposits.

Brines containing lithium are found in various parts of the world, including South America, China, and the United States. These brines are usually located in large underground aquifers or salt lakes and are typically found at great depths. The concentration of lithium in brine deposits varies widely but may range from tens of parts per million to several thousand parts per million. Conventional lithium extraction processes involve several stages, including the collection of the brine from underground aquifers or salt lakes, evaporation, filtration, electrolysis, purification, and refining. The end result of the extraction process is high-quality lithium metal that may be used in various industries and applications.

Alternatively, the lithium found in the brines may be extracted by the precipitation reaction of lithium with soda ash (i.e., sodium carbonate) to form lithium carbonate, which has low water solubility. This lithium extraction process may include sub-processes such as solar evaporation and magnesium removal through chemical precipitation. Magnesium, when reacted with soda ash, also forms the highly water-insoluble magnesium carbonate, necessitating the removal of magnesium from the brines prior to lithium extraction with soda ash. Furthermore, magnesium may be similarly chemically precipitated by the addition of slaked lime (i.e., calcium hydroxide) to form magnesium hydroxide, in addition to magnesium precipitation by an amount of soda ash unlikely to co-precipitate lithium. Through the evaporation and chemical precipitation of the brines, lithium, magnesium, and other valuable materials such as salts, potash, gypsum, calcite, and brucite may be extracted and utilized in further applications.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including." "comprises", and/or "comprising." and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

As used herein, the terms "optional" or "optionally" mean that the subsequently described event or circumstance does or does not occur (or an element is or is not present) and that the description includes instances where said event or circumstance occurs and instances where said event or circumstance does not occur.

Methods of the present disclosure may comprise evaporating at least a portion of a brine comprising magnesium and lithium using a number of one or more solar evaporation ponds to form a first slurry. Solar evaporation ponds are shallow bodies of water contained in natural or artificial vessels (e.g., a natural or man-made hole in the ground with or without a liner, an above-ground man-made container, and the like). Solar evaporation ponds preferably have a large surface area and are designed to efficiently evaporate water by sunlight.

The brine may, for example, have a concentration of magnesium of about 100 ppm to about 50,000 ppm (or about 100 ppm to about 40,000 ppm, or about 100 ppm to about 30,000 ppm, or about 100 ppm to about 20,000 ppm, or about 100 ppm to about 10,000 ppm, or about 100 ppm to about 1,000 ppm, or about 1,000 ppm to about 50,000 ppm, or about 1,000 ppm to about 40,000 ppm, or about 1,000 ppm to about 30,000 ppm, or about 1,000 ppm to about 20,000 ppm, or about 1,000 ppm to about 10,000 ppm, or about 10,000 ppm to about 50,000 ppm, or about 10,000 ppm to about 40,000 ppm, or about 10,000 ppm to about 30,000 ppm, or about 10,000 ppm to about 20,000 ppm, or about 20,000 ppm to about 50,000 ppm, or about 20,000 ppm to about 40,000 ppm, or about 20,000 ppm to about 30,000 ppm, or about 30,000 ppm to about 50,000 ppm, or about 30,000 ppm to about 40,000 ppm, or about 40,000 ppm to about 50,000 ppm).

Additionally, the brine may, for example, have a concentration of lithium of about 0.01 ppm to about 5,000 ppm (or about 0.01 ppm to about 1,000 ppm, or about 0.01 ppm to about 500 ppm, or about 0.01 ppm to about 100 ppm, or about 0.01 ppm to about 10 ppm, or about 0.01 ppm to about 1 ppm, or about 1 ppm to about 5,000 ppm, or about 1 ppm to about 1,000 ppm, or about 1 ppm to about 500 ppm, or about 1 ppm to about 100 ppm, or about 1 ppm to about 10 ppm, or about 10 ppm to about 5,000 ppm, or about 10 ppm to about 1,000 ppm, or about 10 ppm to about 500 ppm, or about 10 ppm to about 100 ppm, or about 100 ppm to about 5,000 ppm, or about 100 ppm to about 1,000 ppm, or about 100 ppm to about 500 ppm, or about 500 ppm to about 5,000 ppm, or about 500 ppm to about 1,000 ppm, or about 1,000 ppm to about 5,000 ppm).

The brine, in addition to magnesium and lithium, may further comprise one or more ions of: calcium, sodium, potassium, chloride, bicarbonate, sulfate, the like, and any combination thereof.

A first solid or a first liquid may be separated from the first slurry. In the case that a first solid is separated from the first slurry, the first solid may be combined with an amount of a first precipitation additive comprising soda ash, slaked lime, or a combination thereof to form a second slurry. The second slurry may comprise magnesium hydroxide, magnesium carbonate, or a combination thereof. A first liquid may be separated from the second slurry and at least a portion of the first liquid may be evaporated in a solar evaporation pond to form a third slurry. A second liquid may be separated from the third slurry and combined with an amount of a second precipitation additive comprising soda ash to form a fourth slurry comprising lithium carbonate. A second solid may be separated from the fourth slurry and rehydrated to form a fifth slurry. A solid product may be separated from the fifth slurry, wherein a salt in the solid product comprises lithium carbonate.

In the case that a first liquid is separated from the first slurry, the first liquid may be combined with an amount of a first precipitation additive comprising soda ash, slaked lime, or a combination thereof to form a second slurry. The second slurry may comprise magnesium hydroxide, magnesium carbonate, or a combination thereof. A second liquid may be separated from the second slurry and at least a portion of the second liquid may be evaporated in a solar evaporation pond to form a third slurry. A third liquid may be separated from the third slurry and combined with an amount of a second precipitation additive comprising soda ash to form a fourth slurry. The fourth slurry may comprise lithium carbonate. A first solid may be separated from the fourth slurry and rehydrated to form a fifth slurry. A solid product may be separated from the fifth slurry, wherein a salt in the solid product comprises lithium carbonate.

In the case that at least a portion of the second liquid is not evaporated in a solar evaporation pond, the second liquid may be directly combined with the second precipitation additive comprising soda ash to form a third slurry comprising lithium carbonate. A first solid may be separated from the third slurry and rehydrated to form a fourth slurry. A solid product may be separated from the fourth slurry, wherein a salt in the solid product comprises lithium carbonate.

The number of one or more solar evaporation ponds, the amount of the first precipitation additive, and the amount of the second precipitation additive, may be determined mathematically using a geochemical prediction model. The geochemical prediction model, such as a Harvie-Møller-Weare model, may provide these calculations given the initial composition of the brine. For example, PHREEQC (USGS-.gov) geochemical equilibrium modeling software may be used to provide the number of one or more solar evaporation ponds, the amount of the first precipitation additive, and the amount of the second precipitation additive as outputs. The geochemical prediction model may utilize the law of mass action to determine the solubility of the various components by the components' saturation indexes. Optionally, these numerical values may be pre-determined but utilized in the methods of the present disclosure.

The first precipitation additive comprising soda ash, slaked lime, or a combination thereof may be used to precipitate magnesium from the brine before the precipitation of lithium by soda ash. The reaction of magnesium in the form of magnesium chloride with slaked lime and soda ash may form magnesium hydroxide and calcium carbonate in addition to sodium chloride. If the brine has a high concentration of sulfate, the sulfate may be similarly removed from the brine in the form of a calcium sulfate salt. In this instance, at least a portion of the magnesium in the brine may be removed in the form of magnesium calcium carbonate.

In addition to soda ash and slaked lime, the first precipitation additive may optionally comprise caustic soda (sodium hydroxide) to similarly precipitate magnesium from the brine in the form of magnesium hydroxide.

The second precipitation additive comprising soda ash may be used to precipitate lithium from the brine after the removal of magnesium. The reaction of lithium in the form of lithium chloride with soda ash may form lithium carbonate in addition to sodium chloride. Similarly, the presence of excess calcium (i.e., calcium chloride) in the brine may result in the formation of calcium carbonate when reacted with soda ash.

FIG. 1 illustrates a non-limiting example of a lithium extraction method 100 utilizing soda ash and slaked lime to precipitate magnesium and lithium from a brine 102. A ratio of the concentration of total dissolved solids to the concentration of lithium in the brine 102 may be about 1,500 ppm to about 1,000,000 ppm (or about 1,500 ppm to about 500,000 ppm, or about 1,500 ppm to about 400,000 ppm, or about 1,500 ppm to about 300,000 ppm, or about 1,500 ppm to about 200,000 ppm, or about 200,000 ppm to about 1,000,000 ppm, or about 200,000 ppm to about 500,000 ppm, or about 200,000 ppm to about 400,000 ppm, or about 200,000 ppm to about 300,000 ppm, or about 300,000 ppm to about 1,000,000 pm, or about 300,000 ppm to about 500,000 ppm, or about 300,000 ppm to about 400,000 ppm, or about 400,000 ppm to about 1,000,000 ppm, or about 400,000 ppm to about 500,000 ppm, or about 500,000 ppm to about 1,000,000 ppm). Additionally, the brine 102 may have a concentration of sodium of about 90,000 ppm or less (or about 80,000 ppm or less, or about 70,000 ppm or less, or about 60,000 ppm or less, or about 50,000 ppm or less, or about 40,000 ppm or less, or about 30,000 ppm or less, or about 20,000 ppm or less, or about 10,000 ppm or less).

In method 100, the brine 102 may undergo solar evaporation using a number of one or more solar evaporation ponds 104 to remove a first solid by-product 106. A first slurry 108 may remain following the evaporation in the solar evaporation ponds 114. The first slurry 108 may be separated in a separator 110 into a first solid 112 and a first liquid by-product 114. The first solid 112 may be transferred to a precipitation vessel 116 where the first solid 112 is combined with an amount of a first precipitation additive 118 comprising soda ash, slaked lime, or a combination thereof to form a second slurry 120 comprising a precipitate of magnesium hydroxide, magnesium carbonate, or a combination thereof. The second slurry 120 may be separated in a separator 110 into a second solid by-product 122 and a first liquid 124. The first liquid 124 may be further evaporated in a solar evaporation pond 126 to form a third slurry 128. The third slurry 128 may be separated in a separator 110 into a second liquid by-product 130 and a second liquid 132. The second liquid 132 may be transferred to a precipitation vessel 116 where the second liquid 132 is combined with an amount of a second precipitation additive 134 comprising soda ash to precipitate the lithium from the second liquid 132. The precipitation of the lithium from the second liquid 132 forms a fourth slurry 136 comprising lithium carbonate. The fourth slurry 136 may be separated in a separator 110 into a third liquid by-product 138 and a second solid 140 comprising lithium carbonate. The second solid 140 may be rehydrated in a vessel 142 with water 144 to dissolve remaining non-lithium impurities, forming a fifth slurry 146. The fifth slurry 146 may be separated in a separator 110 into a fourth liquid by-product 148 and a solid product 150 comprising lithium carbonate.

Figure 2:
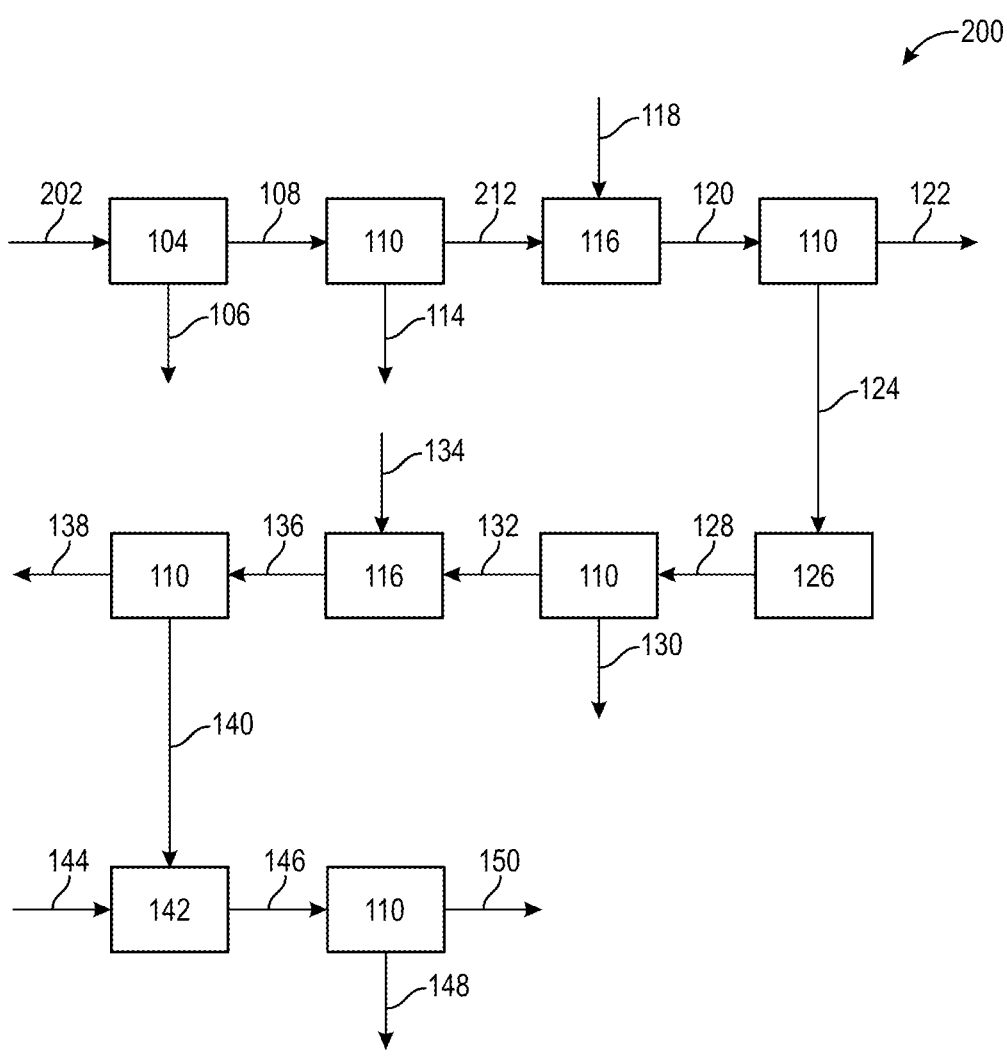
FIG. 2 is a schematic of another lithium extraction method according to one or more embodiments of the present disclosure.

FIG. 2 illustrates another non-limiting example of a lithium extraction method 200 utilizing soda ash and slaked lime to precipitate magnesium and lithium from a brine 202. A ratio of the concentration of total dissolved solids to the concentration of lithium in the brine 202 may be about 1,500 ppm to about 1,000.000 ppm (or about 1,500 ppm to about 500,000 ppm, or about 1,500 ppm to about 400,000 ppm, or about 1,500 ppm to about 300,000 ppm, or about 1,500 ppm to about 200,000 ppm, or about 200,000 ppm to about 1,000,000 ppm, or about 200,000 ppm to about 500,000 ppm, or about 200,000 ppm to about 400,000 ppm, or about 200,000 ppm to about 300,000 ppm, or about 300,000 ppm to about 1,000,000 pm, or about 300,000 ppm to about 500,000 ppm, or about 300,000 ppm to about 400,000 ppm, or about 400,000 ppm to about 1,000,000 ppm, or about 400,000 ppm to about 500,000 ppm, or about 500,000 ppm to about 1,000,000 ppm). Additionally, the brine 202 may have a concentration of sodium of about 90,000 ppm to about 1,000,000 ppm (or about 90,000 ppm to about 500,000 ppm, or about 90,000 ppm to about 400,000 ppm, or about 90,000 ppm to about 300,000 ppm, or about 90,000 ppm to about 200,000 ppm, or about 200,000 ppm to about 1,000,000 ppm, or about 200,000 ppm to about 500.000 ppm, or about 200,000 ppm to about 400,000 ppm, or about 200,000 ppm to about 300,000 ppm, or about 300,000 ppm to about 1,000,000 pm, or about 300,000 ppm to about 500,000 ppm, or about 300,000 ppm to about 400,000 ppm, or about 400,000 ppm to about 1,000,000 ppm, or about 400,000 ppm to about 500,000 ppm, or about 500,000 ppm to about 1,000,000 ppm).

In method 200, the brine 202 may undergo solar evaporation using a number of one or more solar evaporation ponds 104 to remove a first solid by-product 106. A first slurry 108 may remain following the evaporation in the solar evaporation ponds 114. The first slurry 108 may be separated in a separator 110 into a first liquid 212 and a second solid by-product 114. The first liquid 212 may be transferred to a precipitation vessel 116 where the first liquid 212 is combined with an amount of a first precipitation additive 118 comprising soda ash, slaked lime, or a combination thereof to form a second slurry 120 comprising a precipitate of magnesium hydroxide, magnesium carbonate, or a combination thereof. The second slurry 120 may be separated in a separator 110 into a third solid by-product 122 and a second liquid 124. The second liquid 124 may be further evaporated in a solar evaporation pond 126 to form a third slurry 128. The third slurry 128 may be separated in a separator 110 into a first liquid by-product 130 and a third liquid 132. The third liquid 132 may be transferred to a precipitation vessel 116 where the third liquid 132 is combined with an amount of a second precipitation additive 134 comprising soda ash to precipitate the lithium from the third liquid 132. The precipitation of the lithium from the third liquid 132 forms a fourth slurry 136 comprising lithium carbonate. The fourth slurry 136 may be separated in a separator 110 into a second liquid by-product 138 and a first solid 140 comprising lithium carbonate. The first solid 140 may be rehydrated in a vessel 142 with water 144 to dissolve remaining non-lithium impurities, forming a fifth slurry 146. The fifth slurry 146 may be separated in a separator 110 into a third liquid by-product 148 and a solid product 150 comprising lithium carbonate.

Figure 3:
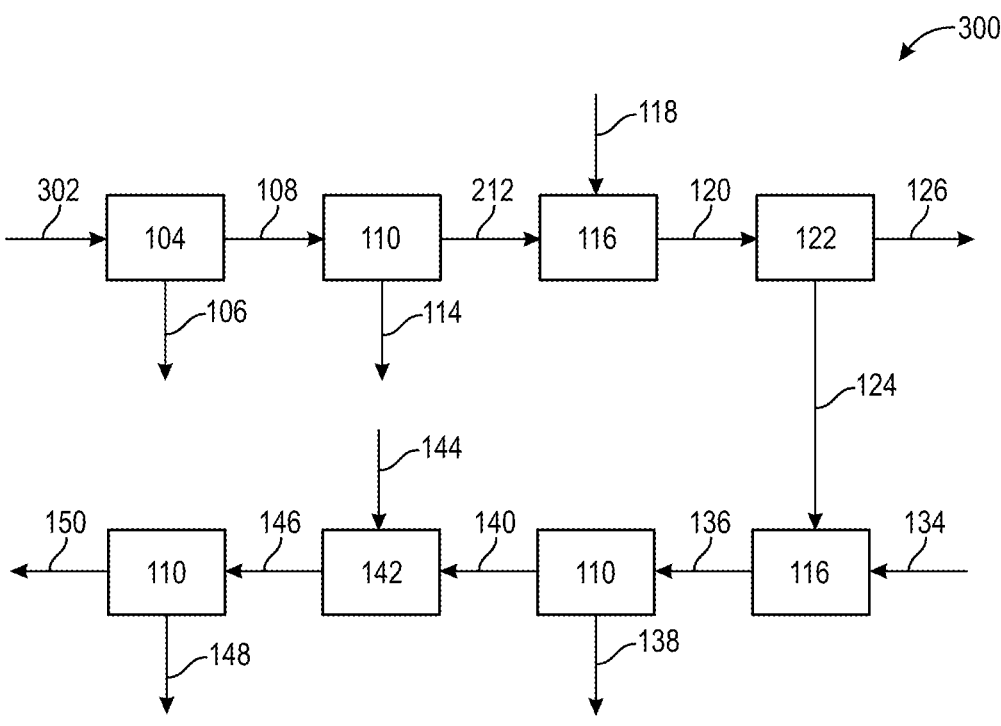
FIG. 3 is a schematic of yet another lithium extraction method according to one or more embodiments of the present disclosure.
Figure 4A:
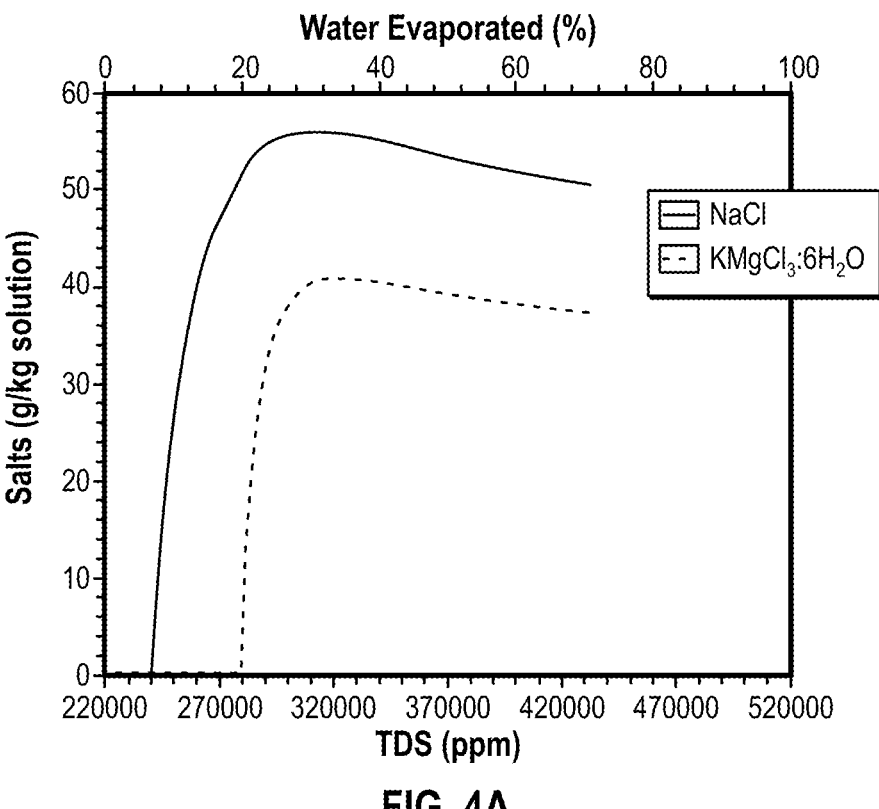
FIGS. 4A-4D are graphs of the paragenetic sequence and amount of salt precipitation from a Dead Sea brine as a function of total dissolved solids (TDS) for a first evaporation sub-process by four solar evaporation ponds.
Figure 4B:
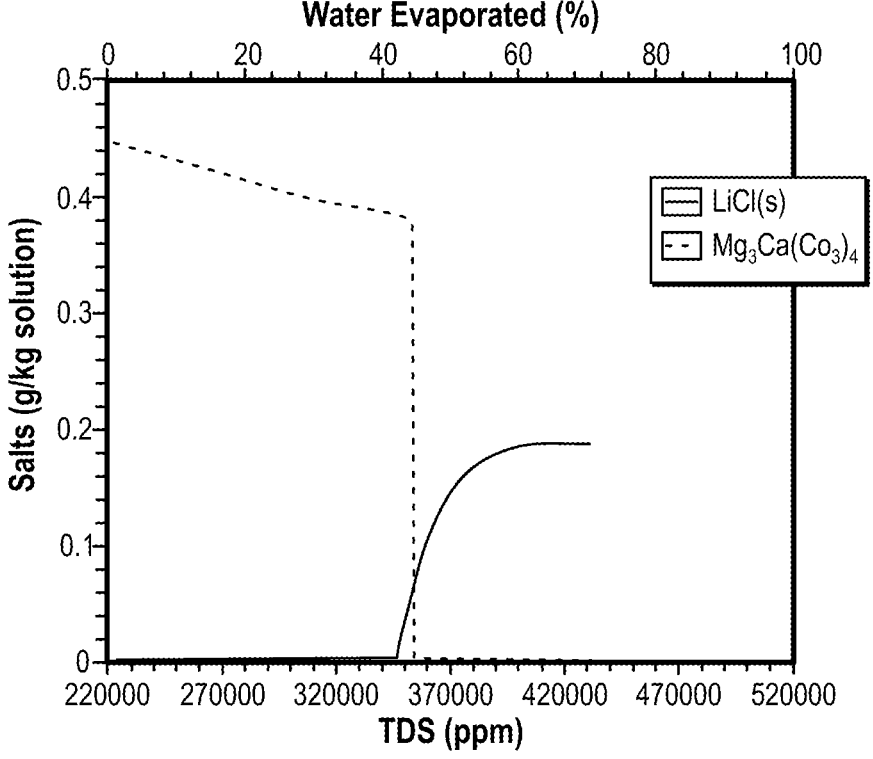
Figure 4C:
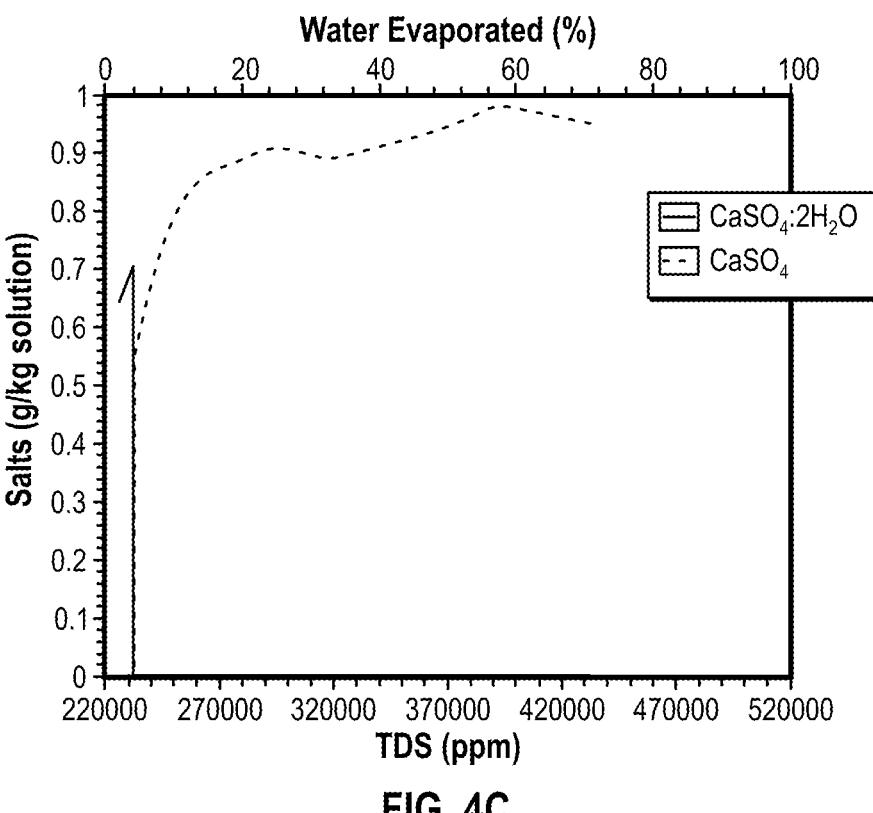
Figure 4D:
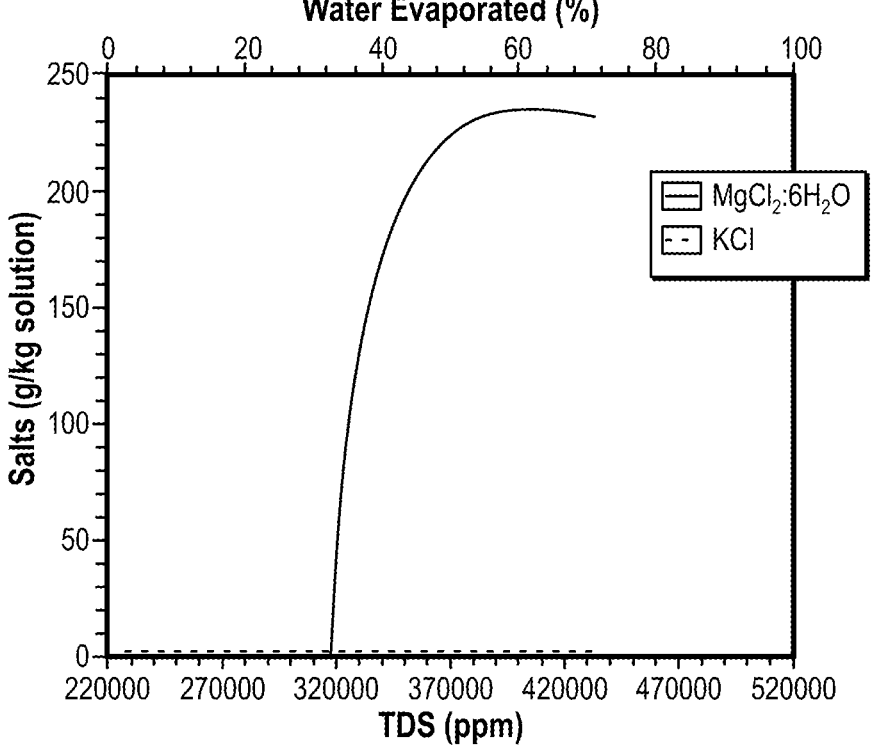

The methods of the present disclosure may not require the use of a second evaporation step in a solar evaporation pond 126. FIG. 3 illustrates a non-limiting example of a lithium extraction method 300 utilizing soda ash and slaked lime to precipitate magnesium and lithium from a brine 302 that does not use a second solar evaporation step. A ratio of the concentration of total dissolved solids to the concentration of lithium in the brine 302 may be less than about 1,500 ppm (or less than about 1,400 ppm, or less than about 1,300 ppm, or less than about 1,200 ppm, or less than about 1,100 ppm, or less than about 1,000 ppm, or less than about 500 ppm).

In method 300, the brine 302 may undergo solar evaporation using a number of one or more solar evaporation ponds 104 to remove a first solid by-product 106. A first slurry 108 may remain following the evaporation in the solar evaporation ponds 114. The first slurry 108 may be separated in a separator 110 into a first liquid 212 and a second solid by-product 114. The first liquid 212 may be transferred to a precipitation vessel 116 where the first liquid 212 is combined with an amount of a first precipitation additive 118 comprising soda ash, slaked lime, or a combination thereof to form a second slurry 120 comprising a precipitate of magnesium hydroxide, magnesium carbonate, or a combination thereof. The second slurry 120 may be separated in a separator 110 into a third solid by-product 122 and a second liquid 124. The second liquid 124 may be transferred to a precipitation vessel 116 where the second liquid 124 is combined with an amount of a second precipitation additive 134 comprising soda ash to precipitate the lithium from the second liquid 124. The precipitation of the lithium from the second liquid 124 forms a third slurry 136 comprising lithium carbonate. The third slurry 136 may be separated in a separator 110 into a first liquid by-product 138 and a first solid 140 comprising lithium carbonate. The first solid 140 may be rehydrated in a vessel 142 with water 144 to dissolve remaining non-lithium impurities, forming a fourth slurry 146. The fourth slurry 146 may be separated in a separator 110 into a second liquid by-product 148 and a solid product 150 comprising lithium carbonate.

The solid product 150 of methods 100, 200, or 300 may, for example, comprise a salt wherein about 90 wt % or more (or about 91 wt % or more, or about 92 wt % or more, or about 93 wt % or more, or about 94 wt % or more, or about 95 wt % or more, or about 96 wt % or more, or about 97 wt % or more, or about 98 wt % or more, or about 99 wt % or more) of the salt is lithium carbonate.

FIGS. 1-3 illustrate non-limiting examples of lithium extraction processes. Other configurations of various streams (including combining streams before introduction to a component of the process) are contemplated. Some example variations to FIGS. 1-3 are discussed further herein. Additionally, FIGS. 1-3 are general illustrations and other components may be included in the lithium extraction processes to ensure the proper and safe operation thereof. Additional components may include, but are not limited to, valves, pressure meters, flow rate meters, sensors (e.g., pressure sensors, temperature sensors, flow rate sensors), pumps additional lines or streams (e.g., pipes or conduits for flowing fluids), the like, and any combination thereof.

The following may provide preferred operating conditions (e.g., concentrations and configurations) for various components or streams of the methods of the present disclosure. However, one skilled in the art can appreciate that the operating conditions may vary outside the given ranges and suggestions based on, for example, geographic location, brine composition, and the like.

The first solid by-product 106 obtained from the number of one or more solar evaporation ponds 104 may comprise salts or minerals that may be extracted and utilized in other applications. Examples of the extracted salts or minerals may include, but are not limited to, calcium magnesium carbonate, calcium sulfate, sodium chloride, magnesium chloride, potassium magnesium chloride, potassium chloride, the like, and any combination thereof.

The first slurry 108 obtained from the number of one or more solar evaporation ponds 104 may, for example, have a concentration of total dissolved solids of about 200,000 ppm to about 500,000 ppm (or about 200,000 ppm to about 450,000 ppm, or about 200,000 ppm to about 350,000 ppm, or about 200,000 ppm to about 300,000 ppm, or about 200,000 ppm to about 250,000 ppm, or about 250,000 ppm to about 500,000 ppm, or about 250,000 ppm to about 450,000 ppm, or about 250,000 ppm to about 400,000 ppm, or about 250,000 ppm to about 350,000 ppm, or about 250,000 ppm to about 300,000 ppm, or about 300,000 ppm to about 500,000 ppm, or about 300,000 ppm to about 450,000 ppm, or about 300,000 ppm to about 400,000 ppm, or about 300,000 ppm to about 350,000 ppm, or about 350,000 ppm to about 500,000 ppm, or about 350,000 ppm to about 450,000 ppm, or about 350,000 ppm to about 400,000 ppm, or about 400,000 ppm to about 500,000 ppm, or about 400,000 ppm to about 450,000 ppm, or about 450,000 ppm to about 500,000 ppm).

The slurry 128 obtained from the solar evaporation pond 126 may, for example, have a concentration of total dissolved solids of about 200,000 ppm to about 1,000,000 ppm (or about 200,000 ppm to about 800,000 ppm, or about 200,000 ppm to about 600,000 ppm, or about 200,000 ppm to about 400,000 ppm, or about 400,000 ppm to about 1,000,000 ppm, or about 400,000 ppm to about 800,000 ppm, or about 400,000 ppm to about 600,000 ppm, or about 600,000 ppm to about 1,000,000 ppm, or about 6,000,000 ppm to about 800,000 ppm, or about 800,000 ppm to about 1,000,000 ppm).

The concentration of total dissolved solids may be monitored at any step in the lithium extraction process by a total dissolved solids meter. A total dissolved solids meter may be similarly referred to as a conductivity meter. Furthermore, the total dissolved solids concentration may additionally be determined by gravimetric analysis.

The number of one or more solar evaporation ponds 104 or the solar evaporation pond 126 may comprise a natural or artificial salt pan or similar apparatus designed to extract salts from the brine (102, 202, or 302 herein).

The separator 110 may comprise equipment designed to at least partially separate the solid and liquid phases. For example, the separator 110 may include, but is not limited to, a gravity settler, a sedimenting centrifuge, a hydrocyclone (e.g., a conical hydrocyclone or a circulating bed hydrocyclone), a classifier, a gravity filter, a line filter, a pressure filter, a filter with compression, a vacuum filter, a filter thickener or crossflow filter, a filtering centrifuge, the like, and any combination thereof.

The precipitation vessel 116 may comprise equipment able to withstand the precipitation reactions of soda ash and slaked lime with magnesium and lithium compounds. Such equipment should be able to at least partially withstand chemical and physical changes including, but not limited to, pH, temperature, pressure, scaling, the like, and any combination thereof.

The vessel 142 used to rehydrate the solid 140 may comprise equipment suitable for mixing the solid 140 and water 144. Examples of suitable vessels 142 include, but are not limited to, tanks, mixers, pressure vessels, the like, and any combination thereof.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Embodiments disclosed herein include:

A. Methods including evaporating at least a portion of a brine using a number of one or more solar evaporation ponds to form a first slurry, wherein a concentration of magnesium in the brine is about 100 ppm to about 50,000 ppm and a concentration of lithium in the brine is about 0.01 ppm to about 5,000 ppm and wherein the number of one or more solar evaporation ponds is a first output of a geochemical prediction model. A first solid may be separated from the first slurry and combined with an amount of a first precipitation additive comprising soda ash, slaked lime, or a combination thereof to form a second slurry comprising magnesium hydroxide, magnesium carbonate, or a combination thereof, wherein the amount of the first precipitation additive is a second output of the geochemical prediction model. A first liquid may be separated from the second slurry and at least a portion of the first liquid may be evaporated in a solar evaporation pond to form a third slurry. A second liquid may be separated from the third slurry and combined with an amount of a second precipitation additive comprising soda ash to form a fourth slurry comprising lithium carbonate, wherein the amount of the second precipitation additive is a third output of the geochemical prediction model. A second solid may be separated from the fourth slurry and rehydrated to form a fifth slurry. A solid product may be separated from the fifth slurry, wherein about 90 wt % or more of a salt in the solid product is lithium carbonate.

B. Methods including evaporating at least a portion of a brine using a number of one or more solar evaporation ponds to form a first slurry, wherein a concentration of magnesium in the brine is about 100 ppm to about 50,000 ppm and a concentration of lithium in the brine is about 0.01 ppm to about 5,000 ppm and wherein the number of one or more solar evaporation ponds is a first output of a geochemical prediction model. A first liquid may be separated from the first slurry and combined with an amount of a first precipitation additive comprising soda ash, slaked lime, or a combination thereof, to form a second slurry comprising magnesium hydroxide, magnesium carbonate, or a combination thereof, wherein the amount of the first precipitation additive is a second output of the geochemical prediction model. A second liquid may be separated from the second slurry and at least a portion of the second liquid may be evaporated in a solar evaporation pond to form a third slurry. A third liquid may be separated from the third slurry and combined with an amount of a second precipitation additive comprising soda ash to form a fourth slurry comprising lithium carbonate, wherein the amount of the second precipitation additive is a third output of the geochemical prediction model. A first solid may be separated from the fourth slurry and rehydrated to form a fifth slurry. A solid product may be separated from the fifth slurry, wherein about 90 wt % or of a salt in the solid product is lithium carbonate.

C. Methods including evaporating at least a portion of a brine using a number of one or more solar evaporation ponds to form a first slurry, wherein a concentration of magnesium in the brine is about 100 ppm to about 50,000 ppm and a concentration of lithium in the brine is about 0.01 ppm to about 5,000 ppm and wherein the number of one or more solar evaporation ponds is a first output of a geochemical prediction model. A first liquid may be separated from the first slurry and combined with an amount of a first precipitation additive comprising soda ash, slaked lime, or a combination thereof to form a second slurry comprising magnesium hydroxide, magnesium carbonate, or a combination thereof, wherein the amount of the first precipitation additive is a second output of the geochemical prediction model. A second liquid may be separated from the second slurry and combined with an amount of a second precipitation additive comprising soda ash to form a third slurry comprising lithium carbonate, wherein the amount of the second precipitation additive is a third output of the geochemical prediction model. A first solid may be separated from the third slurry and rehydrated to form a fourth slurry. A solid product may be separated from the fourth slurry, wherein about 90 wt % or more of a salt in the solid product is lithium carbonate.

Each of embodiments A, B, and C may have one or more of the following additional elements in any combination: Element 1: wherein a ratio of total dissolved solids concentration to lithium concentration in the brine is about 1,500 ppm to about 1,000,000 ppm and a concentration of sodium in the brine is less than about 90,000 ppm. Element 2: wherein the geochemical prediction model is a Harvic-Møller-Weare model. Element 3: wherein the first precipitation additive further comprises caustic soda. Element 4: wherein the first slurry has a concentration of total dissolved solids of about 200,000 ppm to about 500,000 ppm. Element 5: wherein the third slurry has a concentration of total dissolved solids of about 200,000 ppm to about 1,000,000 ppm. Element 6: wherein the brine further comprises calcium, sodium, potassium, chloride, bicarbonate, sulfate, or any combination thereof. Element 7: wherein a ratio of total dissolved solids concentration to lithium concentration in the brine is about 1,500 ppm to about 1,000,000 ppm and a concentration of sodium in the brine is about 90,000 ppm to about 1,000,000 ppm. Element 8: wherein a ratio of total dissolved solids concentration to lithium concentration in the brine is less than about 1,500 ppm.

By way of non-limiting example, exemplary combinations applicable to A and B include: Element 1 with Element 2; Element 1 with Element 3; Element 1 with Element 4; Element 1 with Element 5; Element 1 with Element 6; Element 2 with Element 3; Element 2 with Element 4; Element 2 with Element 5; Element 2 with Element 6; Element 2 with Element 7; Element 2 with Element 8; Element 3 with Element 4; Element 3 with Element 5; Element 3 with Element 6; Element 3 with Element 7; Element 3 with Element 8; Element 4 with Element 5; Element 4 with Element 6; Element 4 with Element 7; Element 4 with Element 8; Element 5 with Element 6; Element 5 with Element 7; Element 5 with Element 8; Element 6 with Element 7; Element 6 with Element 8; Element 1 with Element 2, Element 3, Element 4, Element 5, and Element 6; Element 2 with Element 3, Element 4, Element 5, Element 6, and Element 7; Element 2 with Element 3, Element 4, Element 5, Element 6, and Element 8.

EXAMPLES

The following examples of lithium extraction methods have been modeled using PHREEQC geochemical modeling software.

Example 1: Lithium Extraction from Dead Sea Brine

The lithium extraction process for a Dead Sea brine may be summarized by method 100 of FIG. 1. The composition of the Dead Sea brine is given in Table 1.

TABLE 1

| Component | Concentration [ppm] |
|---|---|
| Calcium | 15,330 |
| Magnesium | 38,400 |
| Sodium | 22,420 |
| Potassium | 5,970 |
| Chloride | 176,420 |
| Lithium | 20 |
| Strontium | 274 |
| Bicarbonate | 290 |
| Bromium | 4,840 |
| Sulfate | 760 |

Figure 5:
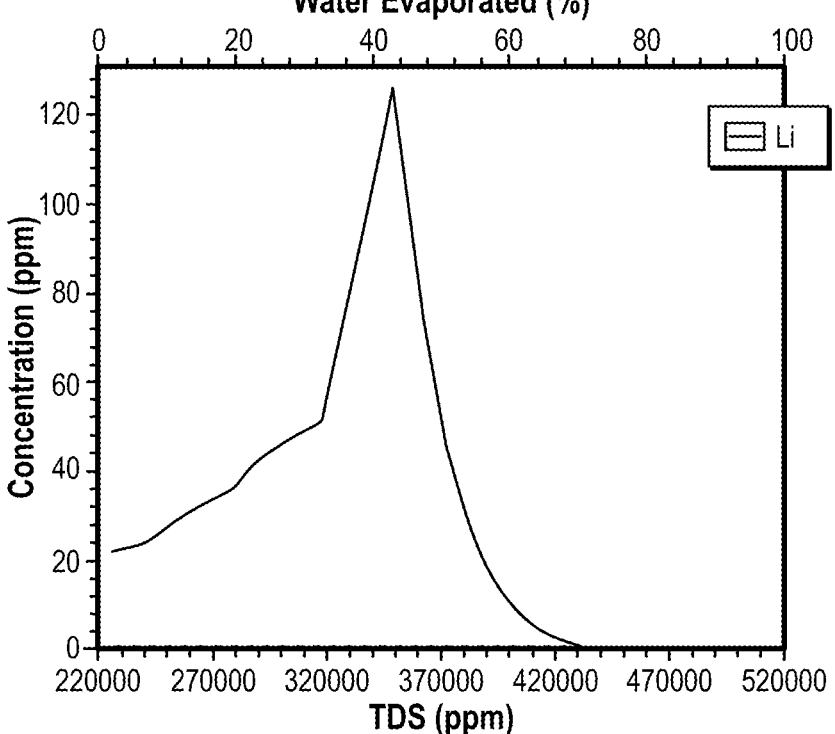
FIG. 5 is a graph of the evolution of the concentration of lithium given the TDS concentration in a Dead Sea brine.
Figure 6A:
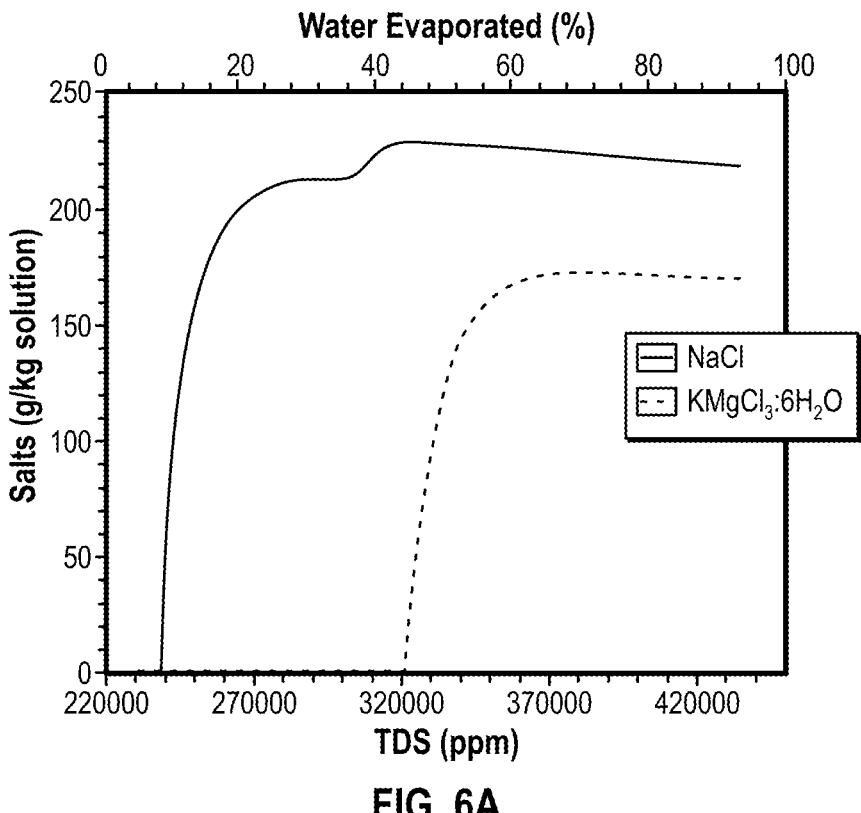
FIGS. 6A-6D are graphs of the paragenetic sequence and amount of salt precipitation from a Great Salt Lake brine as a function of TDS for a first evaporation sub-process by three solar evaporation ponds.
Figure 6B:
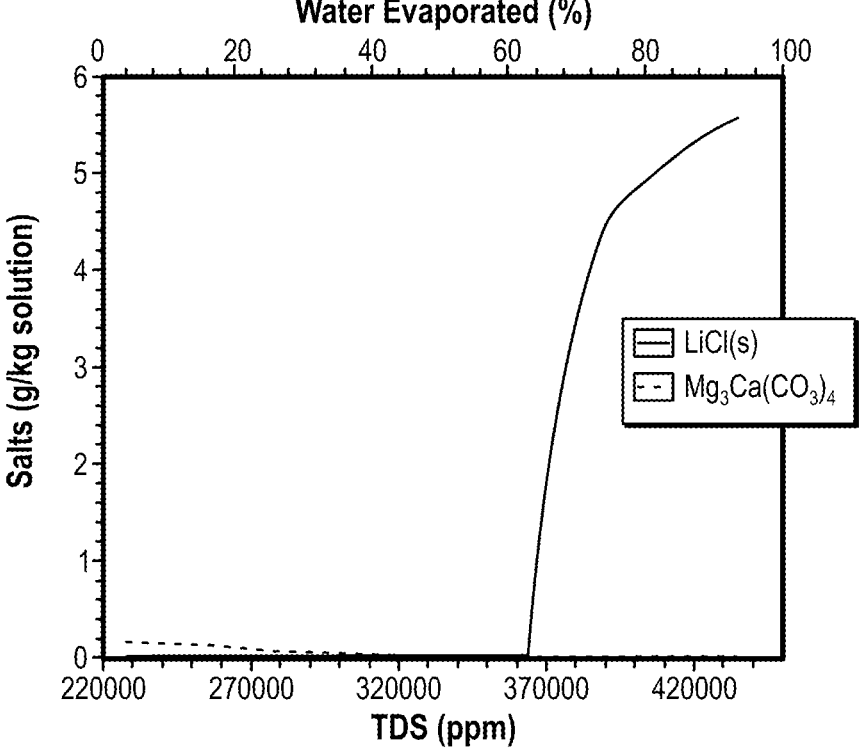
Figure 6C:
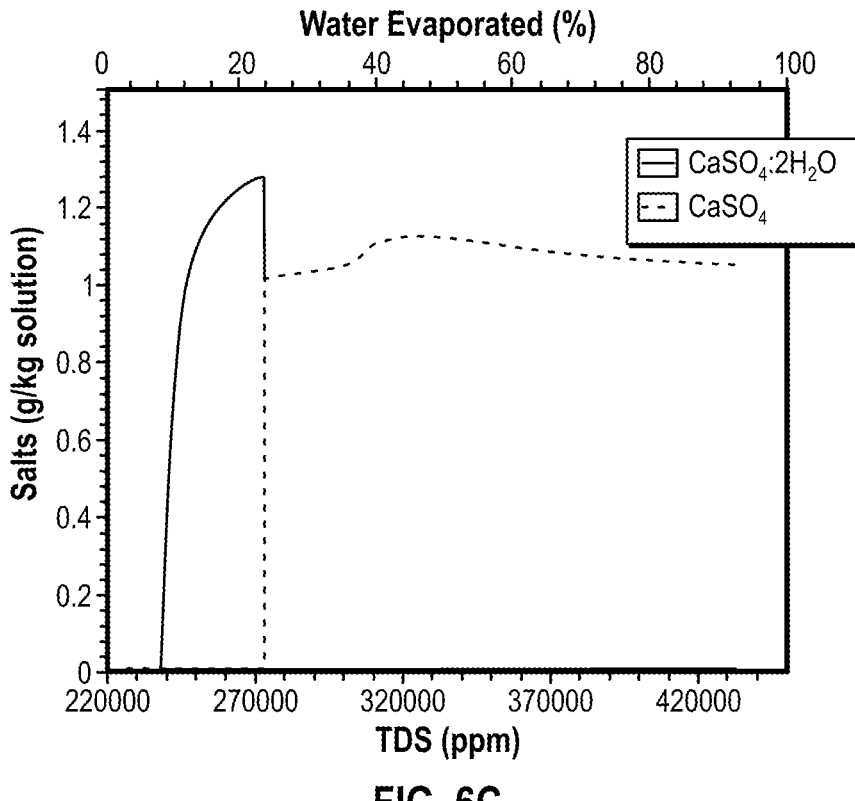
Figure 6D:
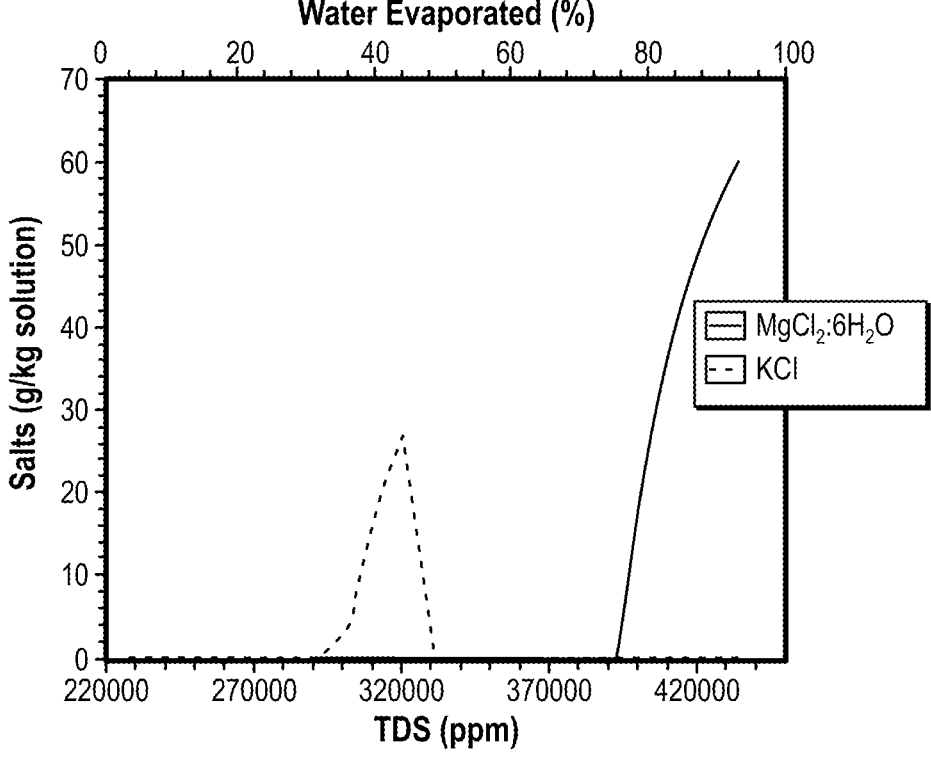

The first evaporation stage by the number of one or more solar evaporation ponds takes place over a series of four solar evaporation ponds. The first evaporation pond concentrates the Dead Sea brine to obtain a brine with a total dissolved solids (TDS) concentration of 240,000 ppm. The concentrated brine at this step contains precipitated calcium magnesium carbonate (0.44 g/kg brine) and calcium sulfate (0.66 g/kg brine) that are separated as by-products. The second solar evaporation pond concentrates the brine to 270,000 ppm TDS and precipitates sodium chloride (54 g/kg brine) and calcium sulfate (0.2 g/kg brine) which are separated as by-products. The third solar evaporation pond concentrates the brine to 360,000 ppm TDS and precipitates magnesium chloride hexahydrate (230 g/kg brine), potassium magnesium chloride hexahydrate (40 g/kg brine) and sodium chloride (2 g/kg brine) as by-products. The fourth solar evaporation pond concentrates the brine to 430,000 ppm TDS and precipitates lithium chloride (0.2 g/kg brine) and magnesium chloride hexahydrate (4 g/kg brine). FIGS. 4A-4D show the paragenetic sequence and amount of salt precipitation from the Dead Sea brine as a function of TDS for the first evaporation sub-process by the four solar evaporation ponds. FIG. 5 shows the evolution of the concentration of lithium given the TDS concentration in the Dead Sea brine.

The lithium chloride and magnesium chloride hexahydrate precipitates are separated from the concentrated brine as and combined with a first precipitation additive containing soda ash (89 g/kg solid), slaked lime (62 g/kg solid), and water (2.5 kg/kg solid) to form a slurry. From the slurry, magnesium hydroxide (47 g/kg solid) and calcium carbonate (84 g/kg solid) are removed, and the remaining liquid is evaporated in a fifth solar evaporation pond to obtain a concentrated evaporated brine of 290,000 ppm TDS and precipitated sodium chloride (77 g/kg solid). The evaporated brine is combined with a second precipitation additive containing soda ash (281 g/kg evaporated brine) to form a slurry, from which a solid containing sodium chloride (40 g/kg evaporated brine), lithium carbonate (182 g/kg evaporated brine), and calcium carbonate (0.56 g/kg evaporated brine) is separated. The solid is rehydrated to dissolve the sodium chloride, and the liquid containing the dissolved sodium chloride is separated from the solid lithium carbonate (182 g/kg evaporated brine) and calcium carbonate (0.56 g/kg evaporated brine).

Example 2: Lithium Extraction from Great Salt Lake Brine

The lithium extraction process for a Great Salt Lake brine may be summarized by method 100 of FIG. 1. The composition of the Great Salt Lake brine is given in Table 2.

TABLE 2

| Component | Concentration [ppm] |
|---|---|
| Calcium | 319 |
| Magnesium | 8,050 |
| Sodium | 85,700 |
| Potassium | 4,550 |
| Chloride | 147,000 |
| Lithium | 60 |
| Bicarbonate | 327 |
| Boron | 70 |
| Sulfate | 174,000 |

Figure 7:
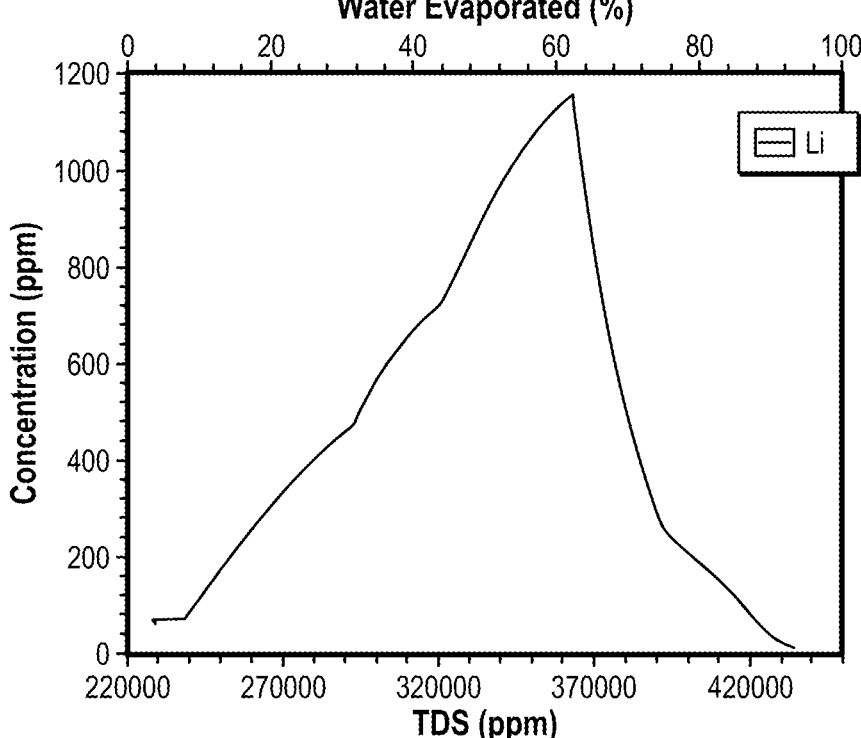
FIG. 7 is a graph of the evolution of the concentration of lithium given the TDS concentration in a Great Salt Lake brine.

The first evaporation stage by the number of one or more solar evaporation ponds takes place over a series of three solar evaporation ponds. The first evaporation pond concentrates the Great Salt Lake brine to obtain a brine with a TDS concentration of 260,000 ppm. The concentrated brine at this step contains precipitated sodium chloride (210 g/kg brine) and calcium sulfate dihydrate (1.3 g/kg brine) that are separated as by-products. The second solar evaporation pond concentrates the brine to 370,000 ppm TDS and precipitates potassium magnesium chloride hexahydrate (170 g/kg brine) and sodium chloride (120 g/kg brine) which are separated as by-products. The third solar evaporation pond concentrates the brine to 430,000 ppm TDS and precipitates magnesium chloride hexahydrate (230 g/kg brine) and lithium chloride (5.5 g/kg brine). FIGS. 6A-6D show the paragenetic sequence and amount of salt precipitation from the Great Salt Lake brine as a function of TDS for the first evaporation sub-process by the three solar evaporation ponds. FIG. 7 shows the evolution of the concentration of lithium given the TDS concentration in the Great Salt Lake brine.

The lithium chloride and magnesium chloride hexahydrate precipitates are separated from the concentrated brine and combined with a first precipitation additive containing soda ash (3.2 g/kg solid), slaked lime (2.2 g/kg solid), and water (15.4 kg/kg solid) to form a slurry. From the slurry, magnesium hydroxide (1.7 g/kg solid) and calcium carbonate (3 g/kg solid) are removed, and the remaining liquid is evaporated in a fourth solar evaporation pond to obtain a concentrated evaporated brine of 320,000 ppm TDS and precipitated sodium chloride (3.1 g/kg solid). The evaporated brine is combined with a second precipitation additive containing soda ash (222 g/kg evaporated brine) to form a slurry, from which a solid containing sodium chloride (41.8 g/kg evaporated brine), lithium carbonate (143 g/kg evaporated brine), and calcium carbonate (0.9 g/kg evaporated brine) is separated. The solid is rehydrated to dissolve the sodium chloride, and the liquid containing the dissolved sodium chloride is separated from the solid lithium carbonate (143 g/kg evaporated brine) and calcium carbonate (0.9 g/kg evaporated brine).

Example 3: Lithium Extraction from a Bonneville Brine

The lithium extraction process for a Bonneville brine may be summarized by method 200 of FIG. 2. The composition of the Bonneville brine is given in Table 3.

TABLE 3

| Component | Concentration [ppm] |
|---|---|
| Calcium | 1,100 |
| Magnesium | 4,900 |
| Sodium | 90,000 |
| Potassium | 7,500 |
| Chloride | 160,000 |
| Lithium | 68 |
| Bicarbonate | 195 |
| Boron | 6 |
| Sulfate | 5,700 |

Figure 8A:
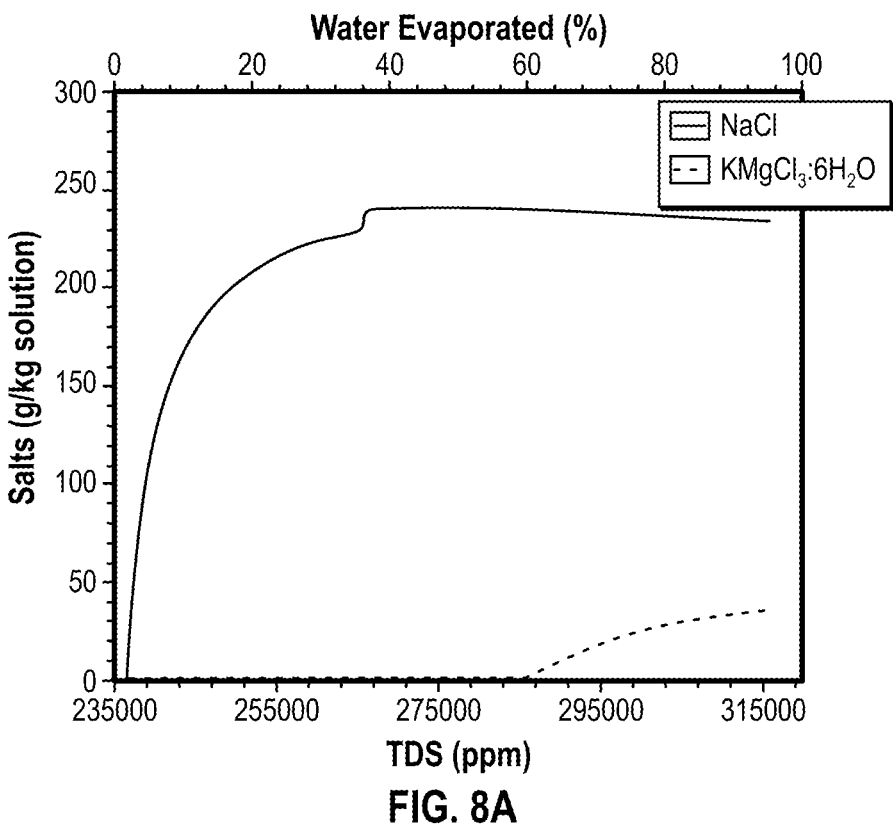
FIGS. 8A-8C are graphs of the paragenetic sequence and amount of salt precipitation from a Bonneville brine as a function of TDS for a first evaporation sub-process by three solar evaporation ponds.
Figure 8B:
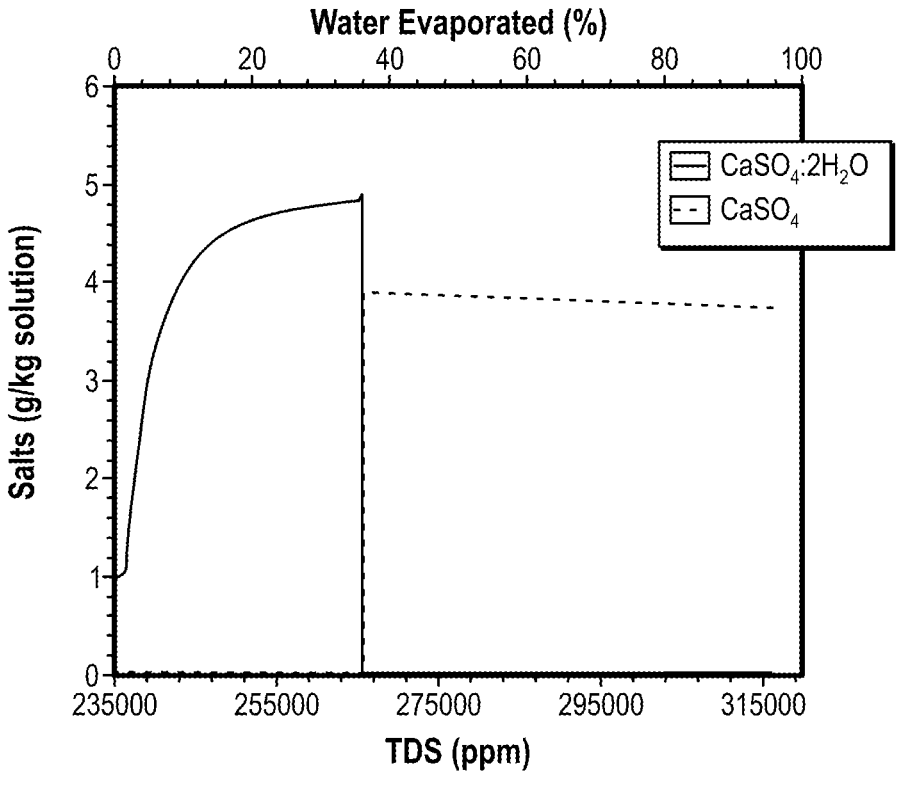
Figure 8C:
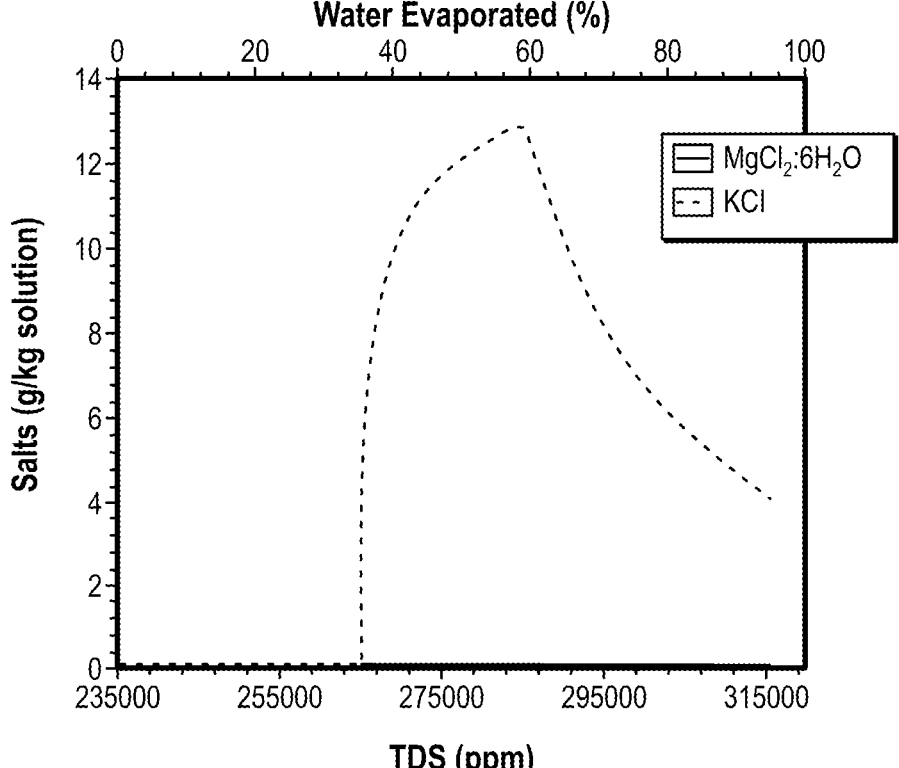
Figure 9:
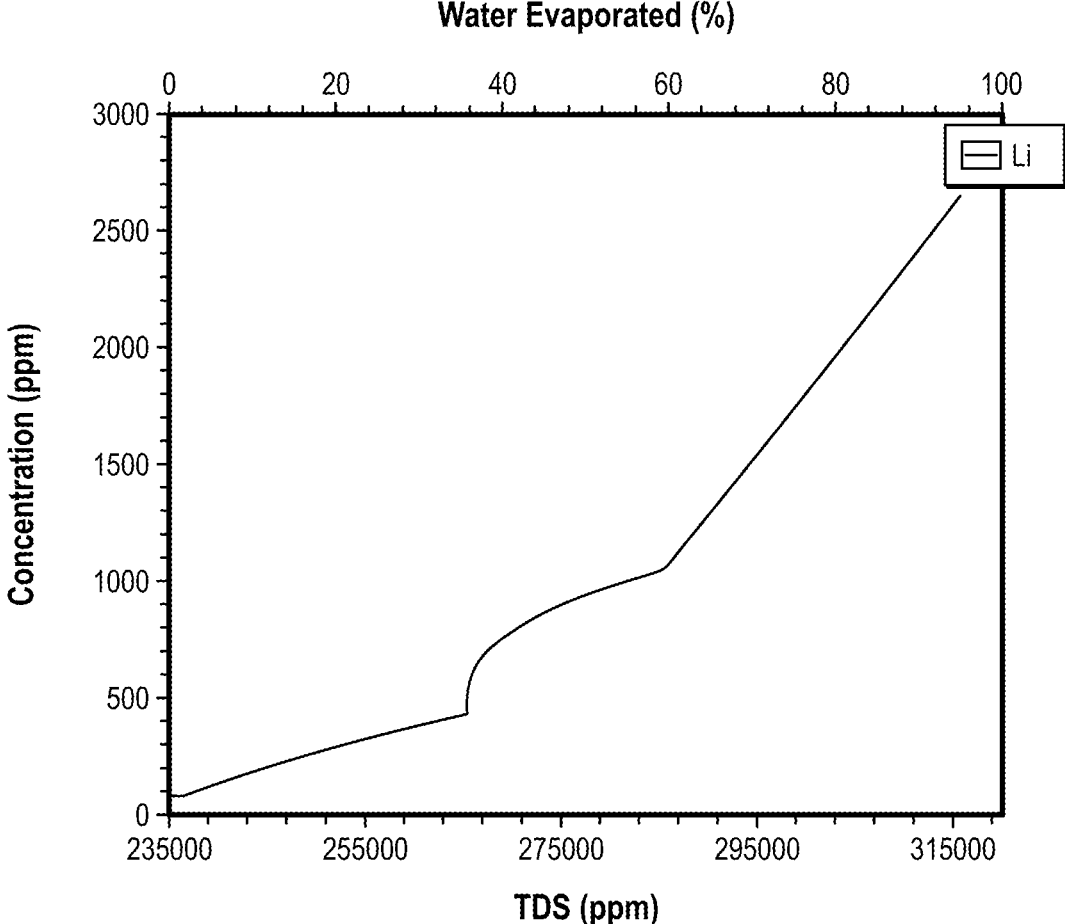
FIG. 9 is a graph of the evolution of the concentration of lithium given the TDS concentration in a Bonneville brine.

The first evaporation stage by the number of one or more solar evaporation ponds takes place over a series of three solar evaporation ponds. The first evaporation pond concentrates the Bonneville brine to obtain a brine with a TDS concentration of 270,000 ppm. The concentrated brine at this step contains precipitated sodium chloride (230 g/kg brine) and calcium sulfate dihydrate (5 g/kg brine) that are separated as by-products. The second solar evaporation pond concentrates the brine to 280,000 ppm TDS and precipitates potassium chloride (13 g/kg brine) which is separated as a by-product. The third solar evaporation pond concentrates the brine to 315,000 ppm TDS and precipitates potassium magnesium chloride hexahydrate (36.2 g/kg brine) that is separated as a by-product, allowing a processed brine to remain. FIGS. 8A-8C show the paragenetic sequence and amount of salt precipitation from the Bonneville brine as a function of TDS for the first evaporation sub-process by the three solar evaporation ponds. FIG. 9 shows the evolution of the concentration of lithium given the TDS concentration in the Bonneville brine.

The processed brine is combined with a first precipitation additive containing soda ash (424 g/kg processed brine) and slaked lime (296 g/kg processed brine) to form a slurry. From the slurry, sodium chloride (158 g/kg processed brine), magnesium hydroxide (221 g/kg processed brine), and calcium carbonate (400 g/kg processed brine) are removed, and the remaining liquid (a spent brine) is evaporated in a fourth evaporation pond to obtain a concentrated evaporated brine of 930,000 ppm TDS and precipitated sodium chloride (2520 g/kg spent brine) and potassium chloride (5 g/kg spent brine). The evaporated brine is combined with a second precipitation additive containing soda ash (117 g/kg evaporated brine) to form a slurry, from which a solid containing sodium chloride (44 g/kg evaporated brine), lithium carbonate (54 g/kg evaporated brine), and calcium carbonate (0.3 g/kg evaporated brine) is separated. The solid is rehydrated to dissolve the sodium chloride, and the liquid containing the dissolved sodium chloride is separated from the solid lithium carbonate (54 g/kg evaporated brine) and calcium carbonate (0.3 g/kg evaporated brine).

Example 4: Lithium Extraction from a Salton Sea Brine

The lithium extraction process for a Salton Sea brine may be summarized by method 300 of FIG. 3. The composition of the Salton Sea brine is given in Table 4.

TABLE 4

| Component | Concentration [ppm] |
|---|---|
| Calcium | 1,000 |
| Magnesium | 1,300 |
| Sodium | 11,000 |
| Potassium | 180 |
| Chloride | 17,000 |
| Lithium | 200 |
| Bicarbonate | 195 |
| Boron | 0.04 |
| Sulfate | 10,000 |

Figure 10A:
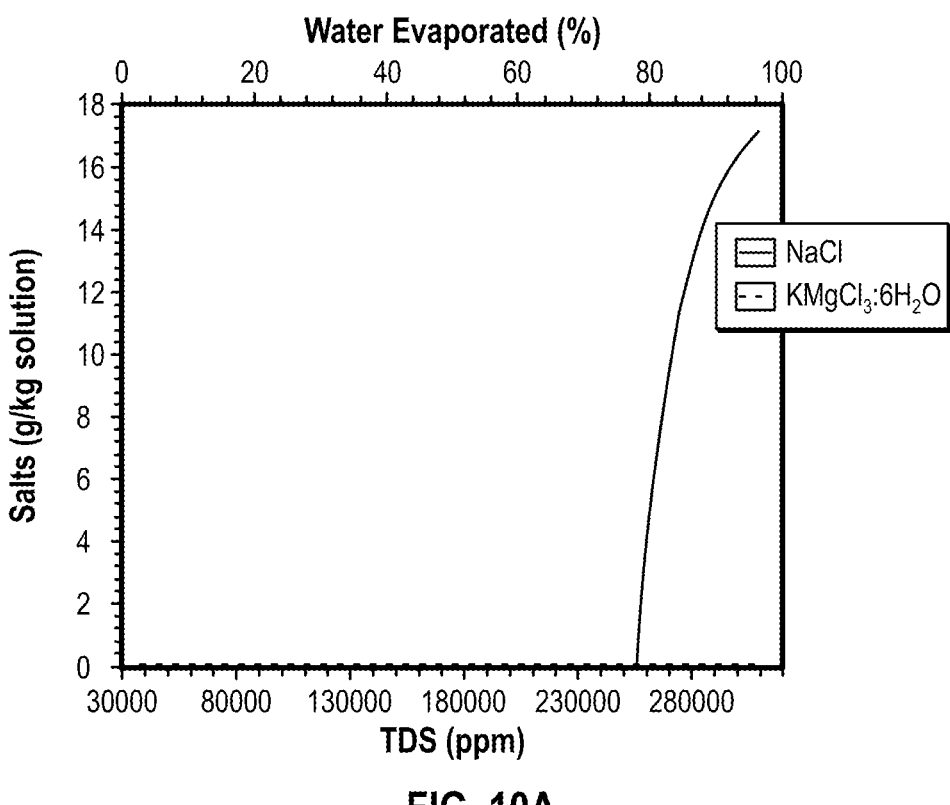
FIGS. 10A-10C are graphs of the paragenetic sequence and amount of salt precipitation from a Salton Sea brine as a function of TDS for a first evaporation sub-process by one solar evaporation pond.
Figure 10B:
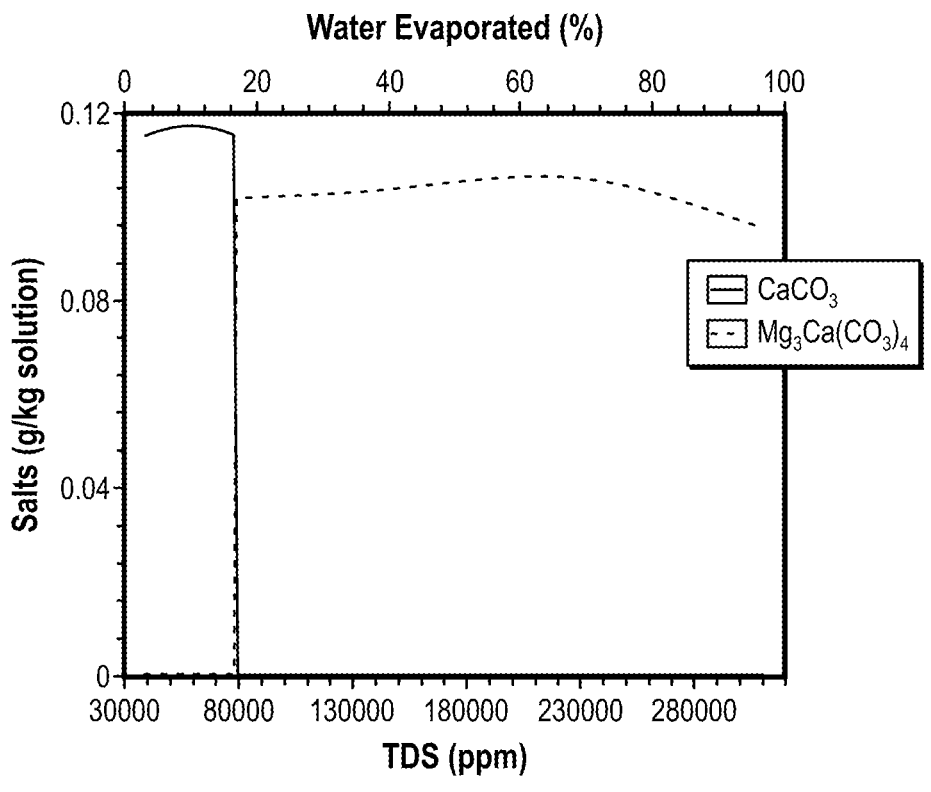
Figure 10C:
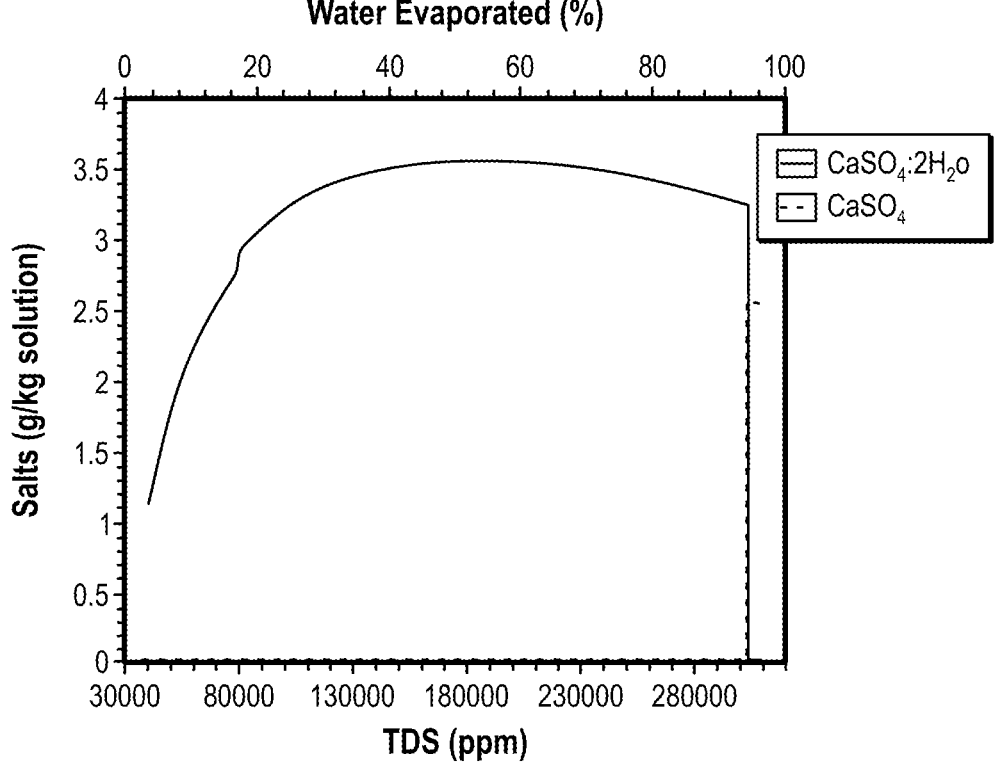
Figure 11:
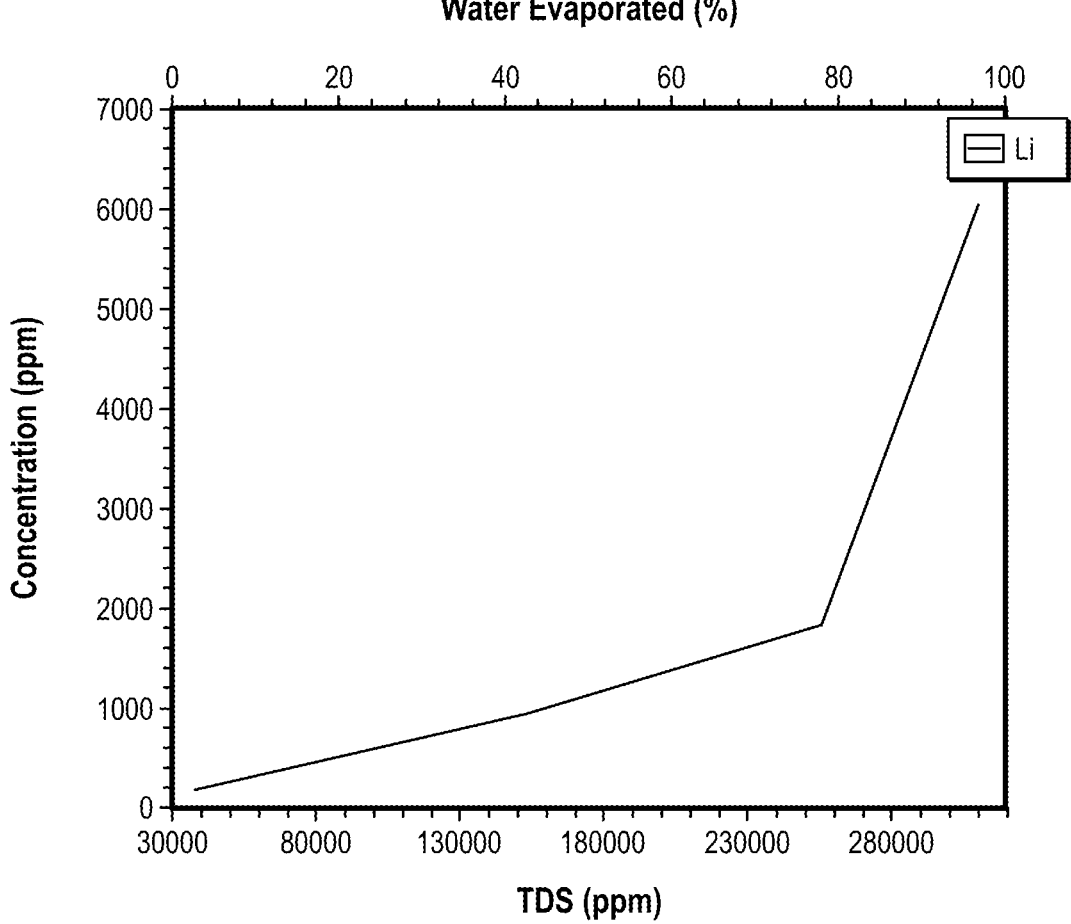
FIG. 11. is a graph of the evolution of the concentration of lithium given the TDS concentration in a Salton Sea brine.

The first evaporation stage by the number of one or more solar evaporation ponds takes place over a single solar evaporation pond. The evaporation pond concentrates the Salton Sea brine to obtain a brine with a TDS concentration of 310,000 ppm. The concentrated brine contains precipitated sodium chloride (5.9 g/kg brine), calcium magnesium carbonate (0.13 g/kg brine), and calcium sulfate (3.5 g/kg brine) that are separated as by-products, allowing a processed brine to remain. FIGS. 10A-10C show the paragenetic sequence and amount of salt precipitation from the Salton Sea brine as a function of TDS for the first evaporation sub-process by the one solar evaporation pond. FIG. 11 shows the evolution of the concentration of lithium given the TDS concentration in the Salton Sea brine.

The processed brine is combined with a first precipitation additive containing soda ash (233 g/kg processed brine) and slaked lime (263 g/kg processed brine) to form a slurry. From the slurry, sodium chloride (2 g/kg processed brine), magnesium hydroxide (126 g/kg processed brine), and calcium carbonate (219 g/kg processed brine) are removed, and the remaining liquid (a spent brine) is combined with a second precipitation additive containing soda ash (84.8 g/kg spent brine) to form a second slurry. From the second slurry, a solid containing sodium chloride (25 g/kg spent brine), lithium carbonate (31.6 g/kg spent brine), and calcium carbonate (0.5 g/kg spent brine) is separated. The solid is rehydrated to dissolve the sodium chloride, and the liquid containing the dissolved sodium chloride is separated from the solid lithium carbonate (31.6 g/kg spent brine) and calcium carbonate (0.5 g/kg spent brine).

Example 5: Lithium Extraction from a Silver Peak Brine

The lithium extraction process for a Silver Peak brine may be summarized by method 300 of FIG. 3. The composition of the Silver Peak brine is given in Table 5.

TABLE 5

| Component | Concentration [ppm] |
|---|---|
| Calcium | 940 |
| Magnesium | 290 |
| Sodium | 95,190 |
| Potassium | 5,890 |
| Silicon | 20 |
| Chloride | 153,710 |
| Lithium | 200 |
| Bicarbonate | 70 |
| Sulfate | 4,420 |

Figure 12A:
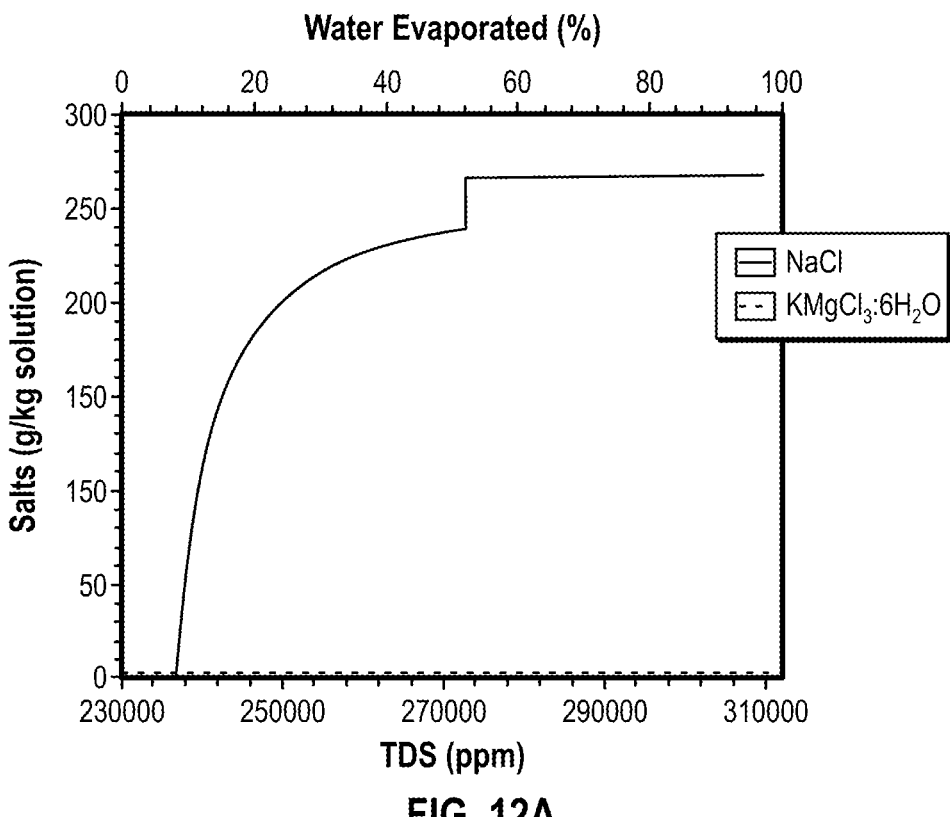
FIGS. 12A-12C are graphs of the paragenetic sequence and amount of salt precipitation from a Silver Peak brine as a function of TDS for a first evaporation sub-process by two solar evaporation ponds.
Figure 12B:
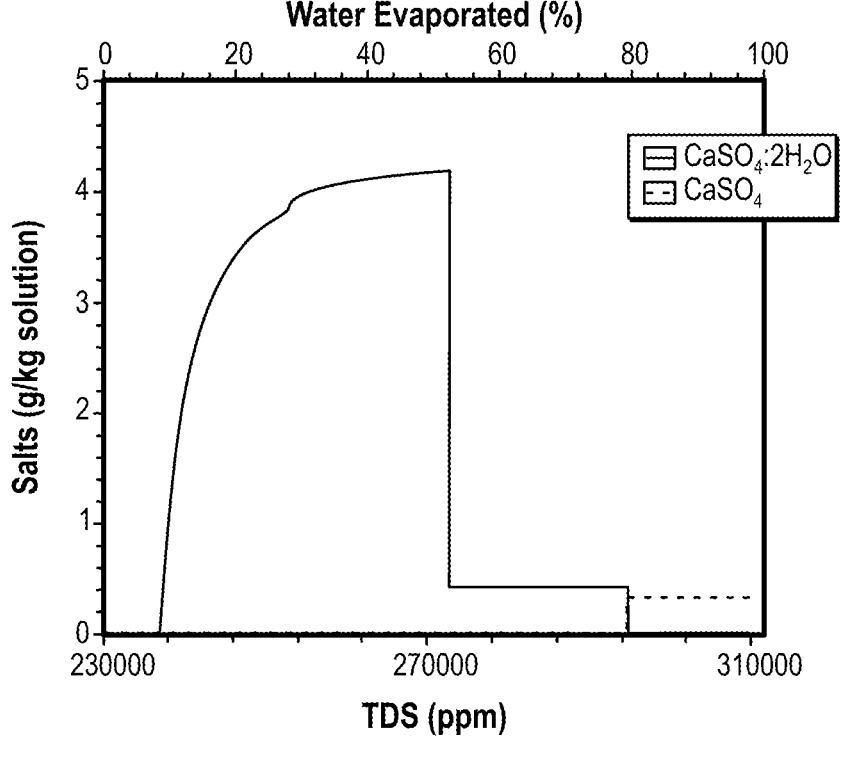
Figure 12C:
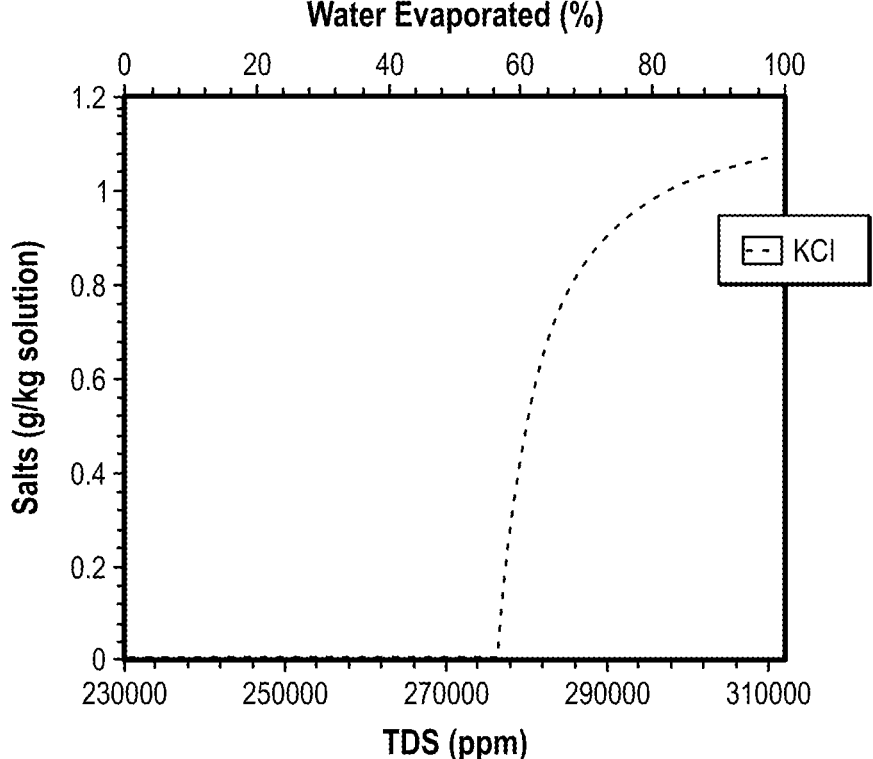
Figure 13:
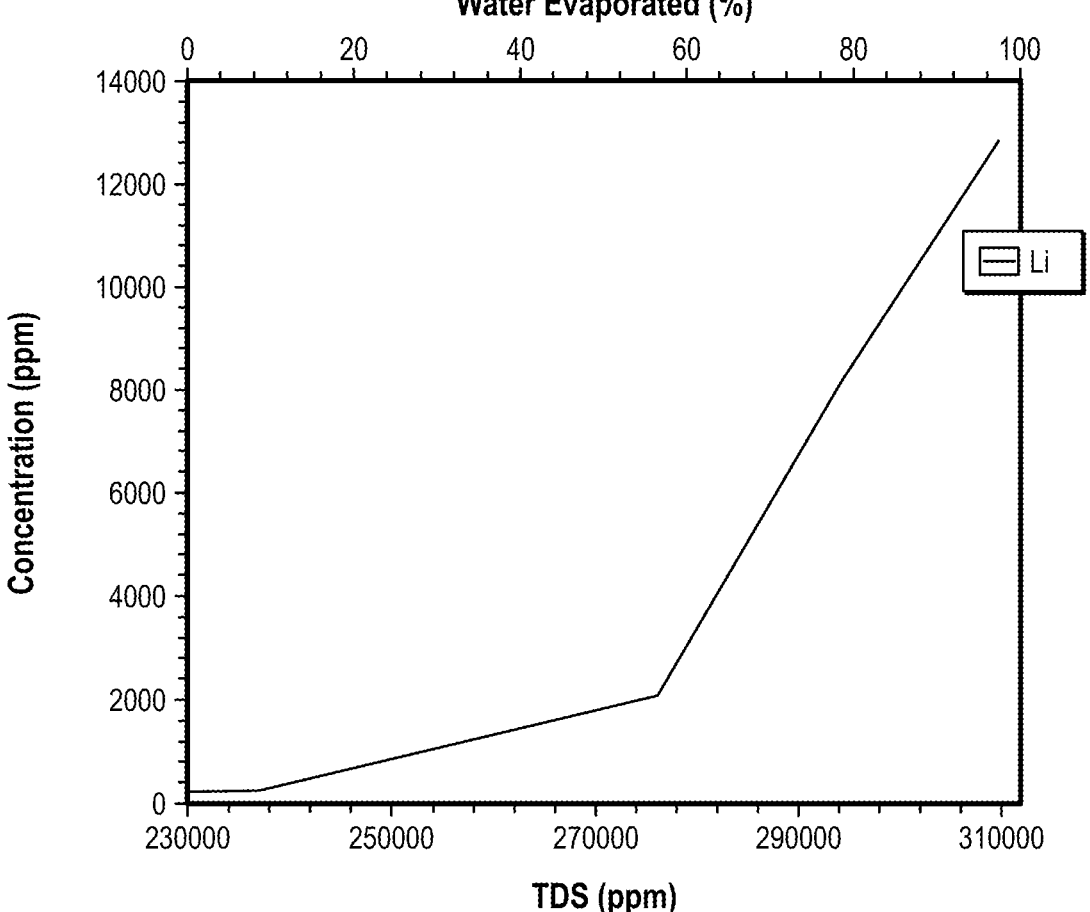
FIG. 13 is a graph of the evolution of the concentration of lithium given the TDS concentration in a Silver Peak brine.

The evaporation stage by the number of one or more solar evaporation ponds takes place over a series of two solar evaporation ponds. The first evaporation pond concentrates the Silver Peak brine to obtain a brine with a TDS concentration of 270,000 ppm. The concentrated brine at this step contains precipitated sodium chloride (235 g/kg brine) and calcium sulfate dihydrate (4.3 g/kg brine) that are separated as by-products. The second solar evaporation pond concentrates the brine to 310,000 ppm TDS and precipitates potassium chloride (1.1 g/kg brine) and sodium chloride (35 g/kg brine) which are separated as by-products, allowing a processed brine to remain. FIGS. 12A-12C show the paragenetic sequence and amount of salt precipitation from the Silver Peak brine as a function of TDS for the first evaporation sub-process by the two solar evaporation ponds. FIG. 13 shows the evolution of the concentration of lithium given the TDS concentration in the Silver Peak brine.

The processed brine is combined with a first precipitation additive containing soda ash (106 g/kg processed brine) and slaked lime (74.1 g/kg processed brine) to form a slurry. From the slurry, sodium chloride (24.8 g/kg processed brine), magnesium hydroxide (55.5 g/kg processed brine), and calcium carbonate (100 g/kg processed brine) are removed, and the remaining liquid (a spent brine) is combined with a second precipitation additive containing soda ash (143 g/kg spent brine) to form a second slurry. From the second slurry, a solid containing sodium chloride (39.2 g/kg spent brine), lithium carbonate (84.4 g/kg spent brine), and calcium carbonate (0.4 g/kg spent brine) is separated. The solid is rehydrated to dissolve the sodium chloride, and the liquid containing the dissolved sodium chloride is separated from the solid lithium carbonate (84.4 g/kg spent brine) and calcium carbonate (0.4 g/kg spent brine).

Example 6: Lithium Extraction from a Salar de Atacama Brine

The lithium extraction process for a Salar de Atacama brine may be summarized by method 300 of FIG. 3. The composition of the Salar de Atacama brine is given in Table 6.

TABLE 5

| Component | Concentration [ppm] |
|---|---|
| Calcium | 568 |
| Magnesium | 2,415 |
| Sodium | 25,210 |
| Potassium | 3,787 |
| Silicon | 34 |
| Chloride | 46,374 |
| Lithium | 1,500 |
| Bicarbonate | 289 |
| Sulfate | 7,150 |

Figure 14A:
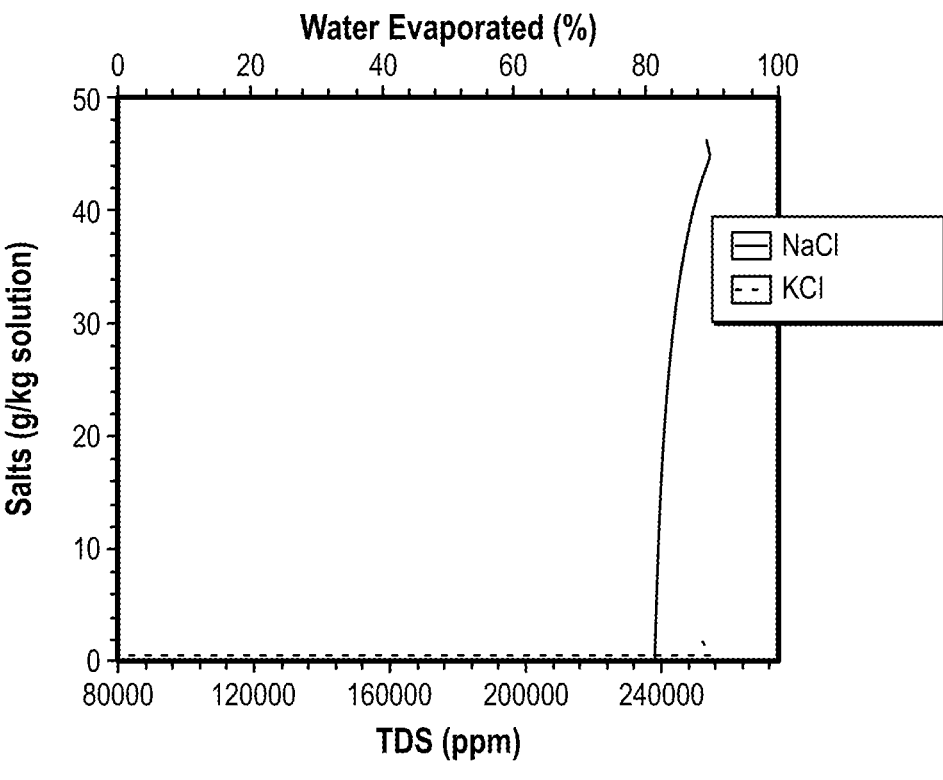
FIGS. 14A-14C are graphs of the paragenetic sequence and amount of salt precipitation from a Salar de Atacama brine as a function of TDS for a first evaporation sub-process by one solar evaporation pond.
Figure 14B:
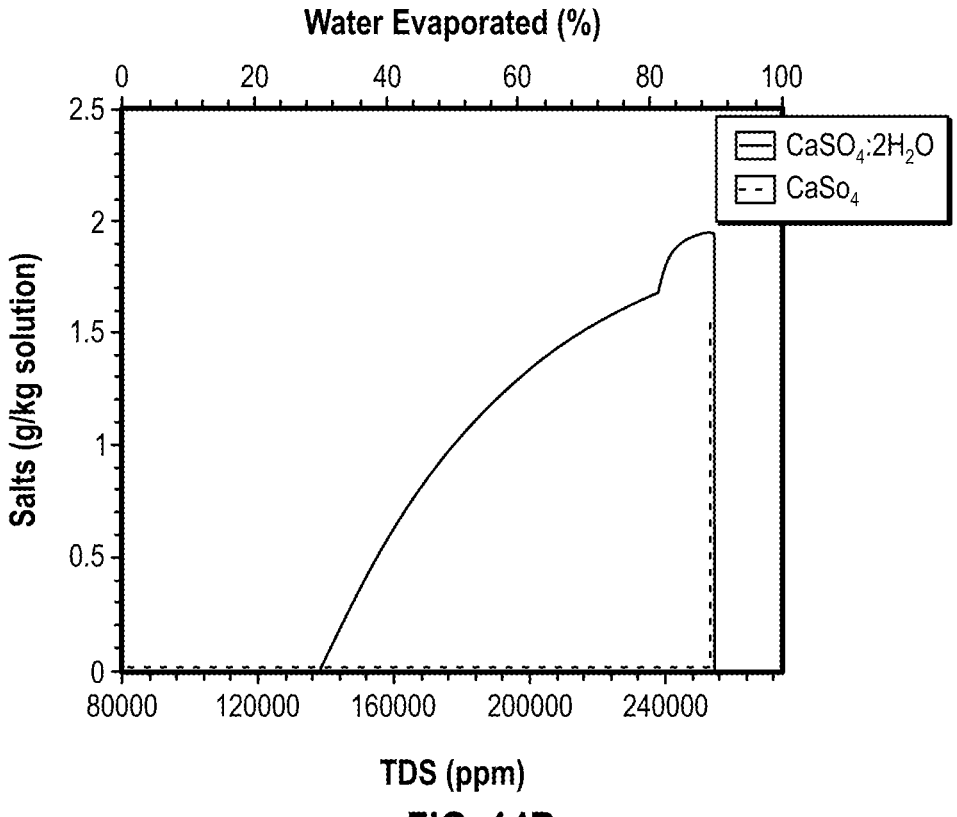
Figure 14C:
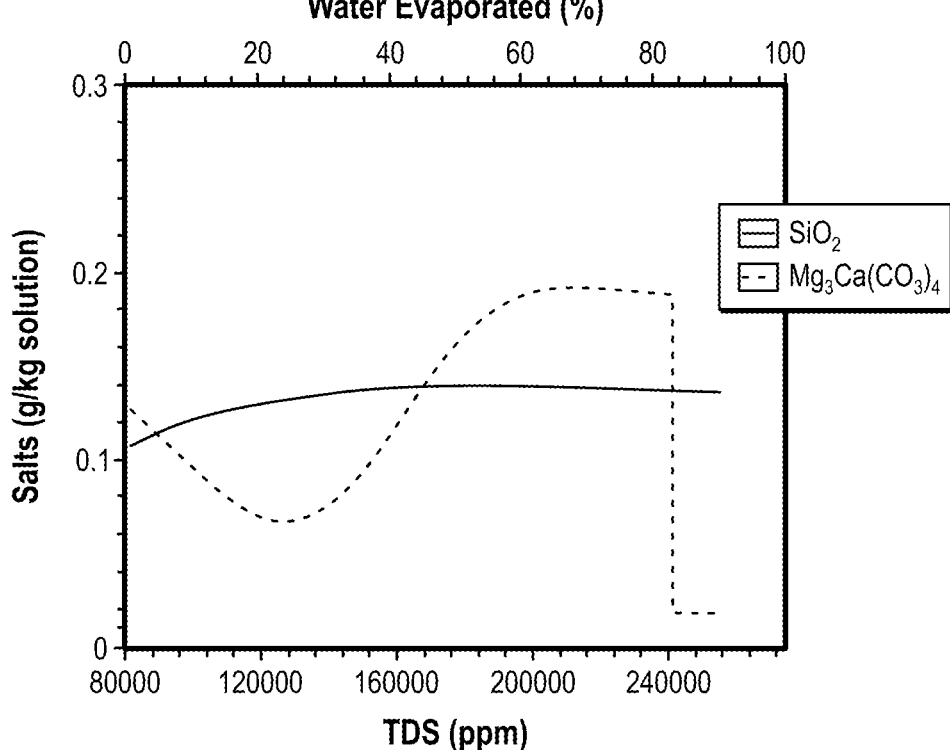
Figure 15:
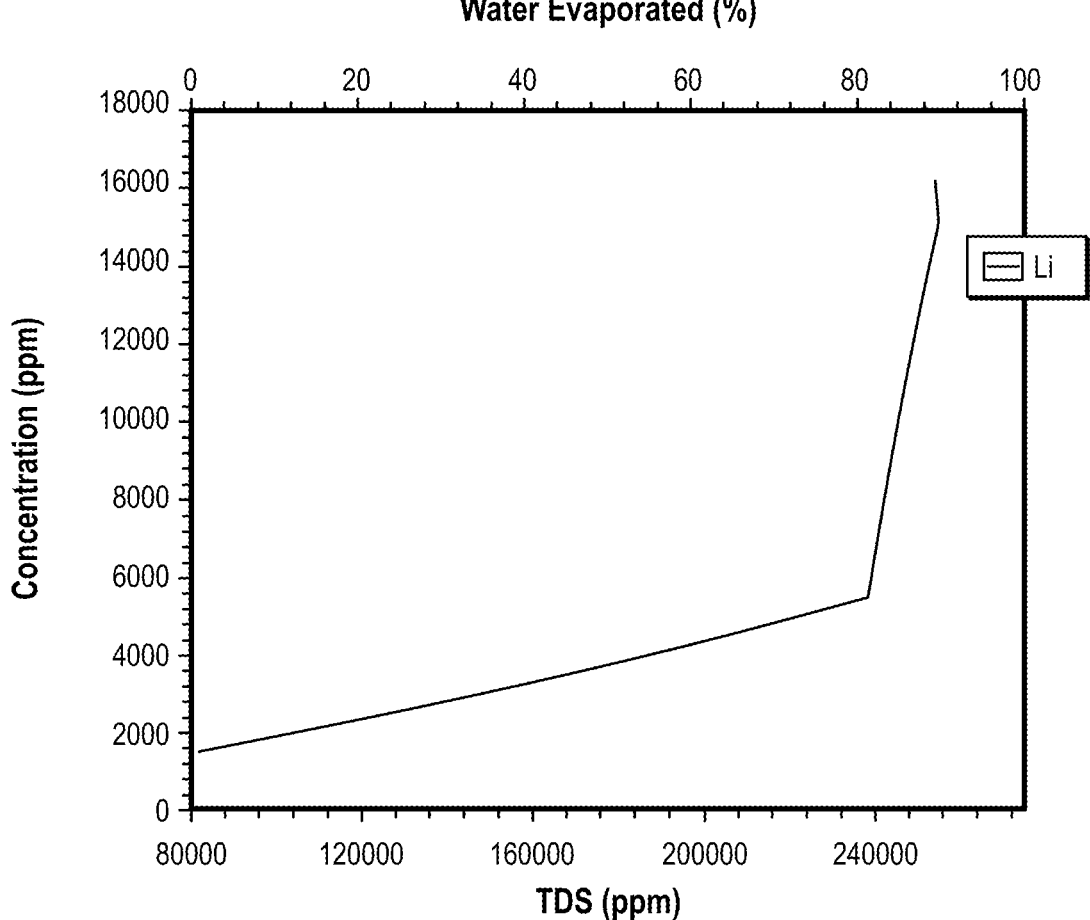
FIG. 15 is a graph of the evolution of the concentration of lithium given the TDS concentration in a Salar de Atacama brine.

The evaporation stage by the number of one or more solar evaporation ponds takes place over a single solar evaporation pond. The evaporation pond concentrates the Salar de Atacama brine to obtain a brine with a TDS concentration of 260,000 ppm. The concentrated brine contains precipitated sodium chloride (46 g/kg brine) and calcium sulfate dihydrate (2 g/kg brine) that are separated as by-products, allowing a processed brine to remain. FIGS. 14A-14C show the paragenetic sequence and amount of salt precipitation from the Salar de Atacama brine as a function of TDS for the first evaporation sub-process by the one solar evaporation pond. FIG. 15 shows the evolution of the concentration of lithium given the TDS concentration in the Salar de Atacama brine.

The processed brine is combined with a first precipitation additive containing soda ash (148 g/kg processed brine) and slaked lime (104 g/kg processed brine) to form a slurry. From the slurry, sodium chloride (19 g/kg processed brine), magnesium hydroxide (77 g/kg processed brine), and calcium carbonate (140 g/kg processed brine) are removed, and the remaining liquid (a spent brine) is combined with a second precipitation additive containing soda ash (159 g/kg spent brine) to form a second slurry. From the second slurry, a solid containing sodium chloride (24.2 g/kg spent brine), lithium carbonate (101 g/kg spent brine), and calcium carbonate (0.8 g/kg spent brine) is separated. The solid is rehydrated to dissolve the sodium chloride, and the liquid containing the dissolved sodium chloride is separated from the solid lithium carbonate (101 g/kg spent brine) and calcium carbonate (0.8 g/kg spent brine).

Example 7: Lithium Extraction from Smackover Formation Brine

The lithium extraction process for a Smackover brine may be summarized by method 100 of FIG. 1. The composition of the Smackover formation brine is given in Table 7.

TABLE 7

| Component | Concentration [ppm] |
|---|---|
| Calcium | 34,534 |
| Magnesium | 3,465 |
| Sodium | 66,973 |
| Potassium | 2,841 |
| Chloride | 177,000 |
| Lithium | 174 |
| Barium | 23 |
| Strontium | 1,924 |
| Bicarbonate | 362 |
| Bromium | 3,126 |
| Boron | 134 |
| Sulfate | 850 |

Figure 16A:
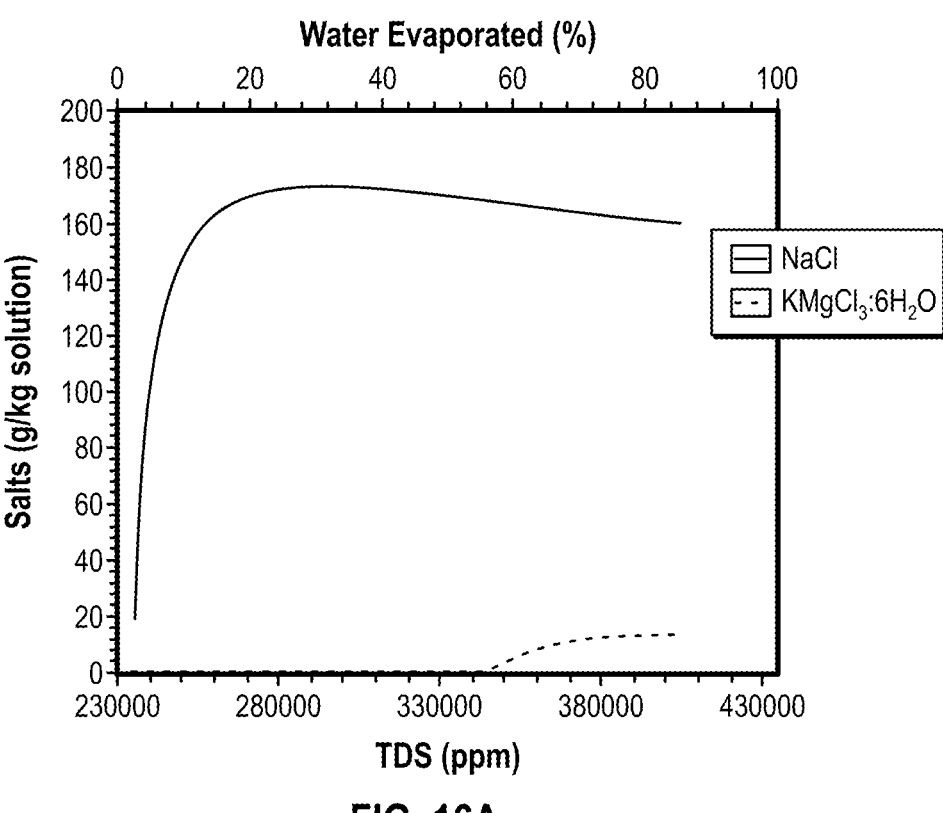
FIGS. 16A-16C are graphs of the paragenetic sequence and amount of salt precipitation from a Smackover formation brine as a function of TDS for a first evaporation sub-process by two solar evaporation ponds.
Figure 16B:
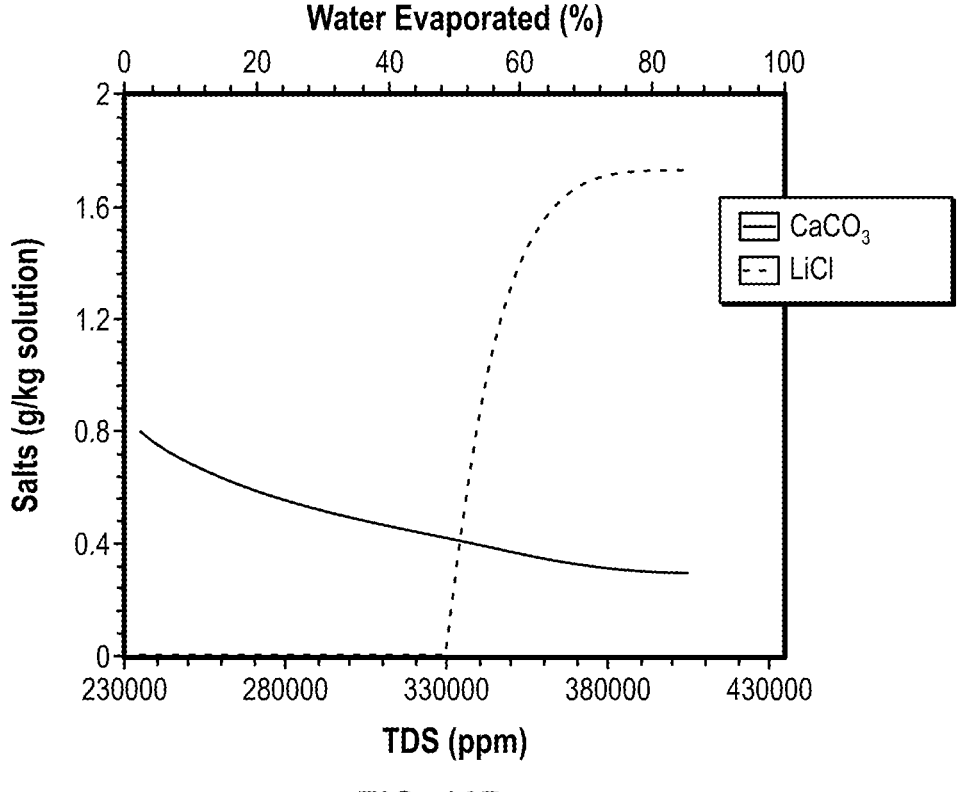
Figure 16C:
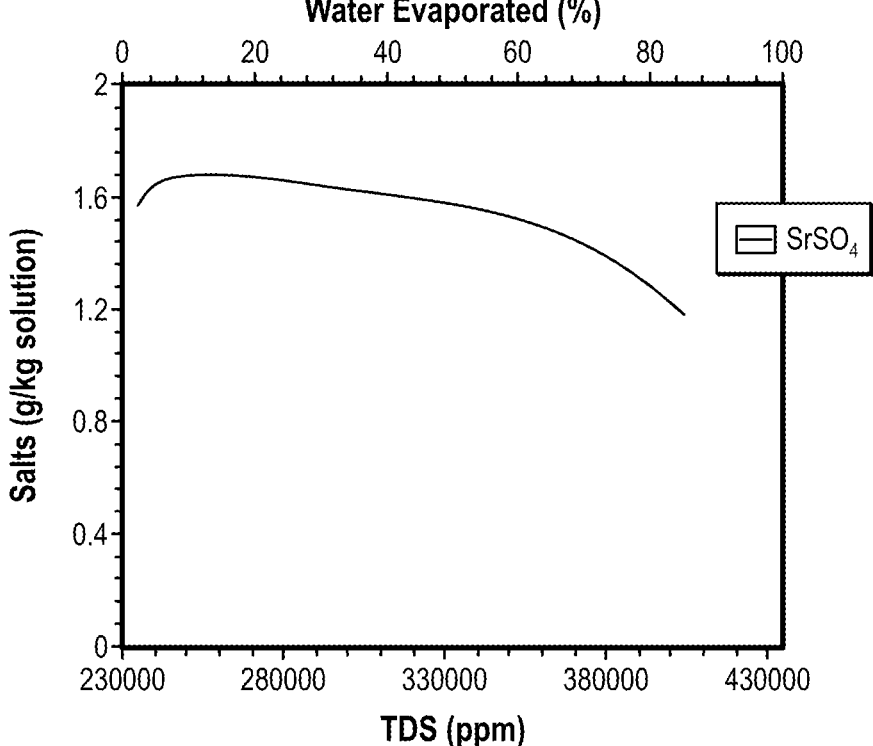
Figure 17:
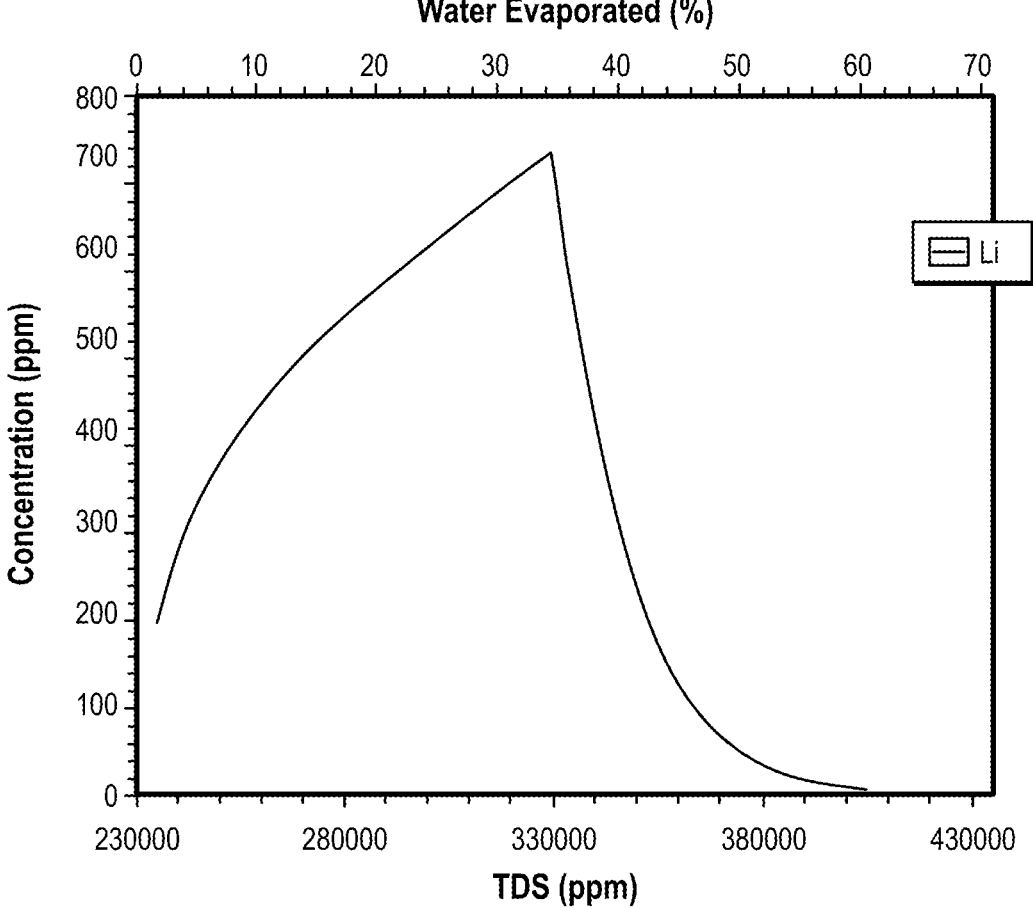
FIG. 17 is a graph of the evolution of the concentration of lithium given the TDS concentration in a Smackover formation brine.

The first evaporation stage by the number of one or more solar evaporation ponds takes place over a series of two solar evaporation ponds. The first evaporation pond concentrates the Smackover formation brine to obtain a brine with a TDS concentration of 290,000 ppm. The concentrated brine at this step contains precipitated sodium chloride (175 g/kg brine), strontium sulfate (1.6 g/kg brine), and calcium carbonate (0.55 g/kg brine) that are separated as by-products. The second solar evaporation pond concentrates the brine to 3,900,000 ppm TDS and precipitates potassium magnesium chloride hexahydrate (13.9 g/kg brine) and lithium chloride (1.8 g/kg brine). FIGS. 16A-16C show the paragenetic sequence and amount of salt precipitation from the Smackover formation brine as a function of TDS for the first evaporation sub-process by the two solar evaporation ponds. FIG. 17 shows the evolution of the concentration of lithium given the TDS concentration in the Smackover formation brine.

The lithium chloride and potassium magnesium chloride hexahydrate precipitates are separated from the brine and combined with a first precipitation additive containing soda ash (5.4 g/kg solid), slaked lime (3.8 g/kg solid), and water (15.7 kg/kg solid) to form a slurry. From the slurry, magnesium hydroxide (43.7 g/kg solid) and calcium carbonate (80 g/kg solid) are removed, and the remaining liquid is evaporated in a third evaporation pond to obtain a concentrated evaporated brine of 345,000 ppm TDS. The evaporated brine is combined with a second precipitation additive containing soda ash (276 g/kg evaporated brine) to form a slurry, from which a solid containing sodium chloride (54 g/kg evaporated brine), lithium carbonate (182 g/kg evaporated brine), and calcium carbonate (0.5 g/kg evaporated brine) is separated. The solid is rehydrated to dissolve the sodium chloride, and the liquid containing the dissolved sodium chloride is separated from the solid lithium carbonate (182 g/kg evaporated brine) and calcium carbonate (0.5 g/kg evaporated brine).

The invention claimed is:

1. A method comprising:

determining a number of one or more solar evaporation ponds; an amount of a first precipitation additive comprising soda ash, slaked lime, or a combination thereof; and an amount of a second precipitation additive comprising soda ash, by using a geochemical prediction model given an initial composition of a brine;

evaporating at least a portion of the brine using the number of one or more solar evaporation ponds to form a first slurry;

wherein a concentration of magnesium in the brine is about 100 ppm to about 50,000 ppm and a concentration of lithium in the brine is about 0.01 ppm to about 5,000 ppm;

separating a first solid from the first slurry;

combining the first solid with the amount of the first precipitation additive to form a second slurry comprising magnesium hydroxide, magnesium carbonate, or a combination thereof;

separating a first liquid from the second slurry;

evaporating at least a portion of the first liquid in a solar evaporation pond to form a third slurry;

separating a second liquid from the third slurry;

combining the second liquid with the amount of the second precipitation additive to form a fourth slurry comprising lithium carbonate;

separating a second solid from the fourth slurry;

rehydrating the second solid to form a fifth slurry; and separating a solid product from the fifth slurry, wherein about 90 wt % or more of a salt in the solid product is lithium carbonate.

2. The method of claim 1, wherein a ratio of total dissolved solids concentration to lithium concentration in the brine is about 1,500 ppm to about 1,000,000 ppm and a concentration of sodium in the brine is less than about 90,000 ppm.

3. The method of claim 1, wherein the geochemical prediction model is a Harvie-Møller-Weare model.

4. The method of claim 1, wherein the first precipitation additive further comprises caustic soda.

5. The method of claim 1, wherein the first slurry has a concentration of total dissolved solids of about 200,000 ppm to about 500,000 ppm.

6. The method of claim 1, wherein the third slurry has a concentration of total dissolved solids of about 200,000 ppm to about 1,000,000 ppm.

7. The method of claim 1, wherein the brine further comprises calcium, sodium, potassium, chloride, bicarbonate, sulfate, or any combination thereof.

8. A method comprising:

determining a number of one or more solar evaporation ponds; an amount of a first precipitation additive comprising soda ash, slaked lime, or a combination thereof; and an amount of a second precipitation additive comprising soda ash, by using a geochemical prediction model given an initial composition of a brine;

evaporating at least a portion of the brine using the number of one or more solar evaporation ponds to form a first slurry;

wherein a concentration of magnesium in the brine is about 100 ppm to about 50,000 ppm and a concentration of lithium in the brine is about 0.01 ppm to about 5,000 ppm;

separating a first liquid from the first slurry;

combining the first liquid with the amount of the first precipitation additive to form a second slurry comprising magnesium hydroxide, magnesium carbonate, or a combination thereof;

separating a second liquid from the second slurry;

evaporating at least a portion of the second liquid in a solar evaporation pond to form a third slurry;

separating a third liquid from the third slurry;

combining the third liquid with the amount of the second precipitation additive to form a fourth slurry comprising lithium carbonate;

separating a first solid from the fourth slurry;

rehydrating the first solid to form a fifth slurry; and separating a solid product from the fifth slurry, wherein about 90 wt % or more of a salt in the solid product is lithium carbonate.

9. The method of claim 8, wherein a ratio of total dissolved solids concentration to lithium concentration in the brine is about 1,500 ppm to about 1,000,000 ppm and a concentration of sodium in the brine is about 90,000 ppm to about 1,000,000 ppm.

10. The method of claim 8, wherein the geochemical prediction model is a Harvie-Møller-Weare model.

11. The method of claim 8, wherein the first precipitation additive further comprises caustic soda.

12. The method of claim 8, wherein the first slurry has a concentration of total dissolved solids of about 200,000 ppm to about 500,000 ppm.

13. The method of claim 8, wherein the third slurry has a concentration of total dissolved solids of about 200,000 ppm to about 1,000,000 ppm.

14. The method of claim 8, wherein the brine further comprises calcium, sodium, potassium, chloride, bicarbonate, sulfate, or any combination thereof.

15. A method comprising:

determining a number of one or more solar evaporation ponds; an amount of a first precipitation additive comprising soda ash, slaked lime, or a combination thereof; and an amount of a second precipitation additive comprising soda ash, by using a geochemical prediction model given an initial composition of a brine;

evaporating at least a portion of the brine using the number of one or more solar evaporation ponds to form a first slurry;

wherein a concentration of magnesium in the brine is about 100 ppm to about 50,000 ppm and a concentration of lithium in the brine is about 0.01 ppm to about 5,000 ppm;

separating a first liquid from the first slurry;

combining the first liquid with the amount of the first precipitation additive to form a second slurry comprising magnesium hydroxide, magnesium carbonate, or a combination thereof;

separating a second liquid from the second slurry;

combining the second liquid with the amount of the second precipitation additive comprising soda ash to form a third slurry comprising lithium carbonate;

separating a first solid from the third slurry;

rehydrating the first solid to form a fourth slurry; and separating a solid product from the fourth slurry, wherein about 90 wt % or more of a salt in the solid product is lithium carbonate.

16. The method of claim 15, wherein a ratio of total dissolved solids concentration to lithium concentration in the brine is less than about 1,500 ppm.

17. The method of claim 15, wherein the geochemical prediction model is a Harvie-Møller-Weare model.

18. The method of claim 15, wherein the first precipitation additive further comprises caustic soda.

19. The method of claim 15, wherein the first slurry has a concentration of total dissolved solids of about 200,000 ppm to about 500,000 ppm.

20. The method of claim 15, wherein the brine further comprises calcium, sodium, potassium, chloride, bicarbonate, sulfate, or any combination thereof.

\*  \*  \*  \*  \*